(12) United States Patent
Jenkins et al.

(10) Patent No.: US 10,373,218 B1
(45) Date of Patent: Aug. 6, 2019

(54) MANAGING USE OF SOFTWARE COMPONENTS

(75) Inventors: Jonathan A. Jenkins, Seattle, WA (US); Benjamin W. Mercier, Issaquah, WA (US); Marvin M. Theimer, Bellevue, WA (US); Eric Jason Brandwine, Haymarket, VA (US); Joseph E. Fitzgerald, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 554 days.

(21) Appl. No.: 12/980,214

(22) Filed: Dec. 28, 2010

(51) Int. Cl.
*G06Q 30/06* (2012.01)

(52) U.S. Cl.
CPC .................... *G06Q 30/06* (2013.01)

(58) Field of Classification Search
USPC ........................................ 705/7.35, 7.11, 1.1
See application file for complete search history.

(56) References Cited

U.S. PATENT DOCUMENTS

| | | | |
|---|---|---|---|
| 5,826,244 A | 10/1998 | Huberman | 705/37 |
| 6,078,906 A | 6/2000 | Huberman | 705/37 |
| 7,865,442 B1 * | 1/2011 | Sowell | 705/59 |
| 2002/0120461 A1 | 8/2002 | Kirkconnell-Ewing et al. | 705/1 |
| 2002/0120519 A1 | 8/2002 | Martin et al. | 705/21 |
| 2003/0066065 A1 * | 4/2003 | Larkin | 717/177 |
| 2003/0195813 A1 | 10/2003 | Pallister et al. | 705/26 |
| 2004/0122926 A1 | 6/2004 | Moore et al. | 709/223 |
| 2004/0243583 A1 | 12/2004 | Olsen | 707/10 |

OTHER PUBLICATIONS

"Metering and Accounting for Web Services," IBM®, Jul. 2001, retrieved from http://www-106.ibm.com/developerworks/library/ws-maws/, 6 pages.
"NTT Com to Launch Asia's First UDDI Registry on Oct. 9," Oct. 8, 2002, NTT Communications, retrieved Sep. 9, 2005, from http://www.ntt.com/release_e/news02/0010/1008.html, 3 pages.

(Continued)

*Primary Examiner* — Akiba K Allen
(74) *Attorney, Agent, or Firm* — Lee & Hayes, P.C.

(57) ABSTRACT

Techniques are described for facilitating use of software components by software applications in a configurable manner. In some situations, the software components are fee-based components that are made available by providers of the components for use by others in exchange for fees defined by the components providers, and in at least some situations, the software components may have various associated restrictions or other non-price conditions related to their use. The described techniques facilitate use of such software components by software applications in a configured manner. Furthermore, in at least some situation, the execution of such software applications is managed by an application deployment system that controls and tracks the execution of the software application on one or more computing nodes, including to manage the execution of any software components that are part of the software application.

20 Claims, 9 Drawing Sheets

(56) References Cited

OTHER PUBLICATIONS

"The Bowstreet™ Business Web Exchange Fuels B2B Revolution With First-of-its-Kind 'Web Services' Marketplace," Mar. 16, 2000, Bowstreet.com Inc., retrieved Sep. 9, 2005, from http://web.archive.org/web/20010219033902/http://www.bowstreet.com/news/press_release . . . , 4 pages.
"The Web Services Architect: Catalysts for Fee-Based Web Services," IBM®, Nov. 2001, retrieved from http://www-106.ibm.com/developerworks/library/ws-arc6/, 7 pages.
"Web Service Use Case," ContentGuard Holdings, Inc., retrieved Aug. 9, 2005, from http://www.contentguard.com/reference/docs/SimpleWebServiceExampleContent.htm, 4 pages.
"Web Service Use Case: Travel Reservation—Use Case May 5, 2002," W3C®, May 2002, retrieved Aug. 9, 2005, from http://www.w3.org/2002/06/ws-example, 9 pages.
"Web Services Architecture Usage Scenarios—W3C Working Draft Jul. 30, 2002," W3C®, Jul. 2002, retrieved Apr. 4, 2008, from http://www.w3.org/TR/2002/WD-ws-arch-scenarios-20020730/, 51 pages.
"Web Services Marketplace," retrieved Sep. 9, 2005, from http://web.archive.org/web/20010404230735/www/epicentric.com/solutions/mkt.jsp, 4 pages.
Actional™, The Web Services Management Platform: Managing the Impact of Change in an Enterprise Web Services Network—Mar. 2003, retrieved Nov. 7, 2003, from http://www.actional.com/downloads/products/managing.enterpriseweb.services.network.pdf, 26 pages.
Actional™, Web Services Management Platform, retrieved Nov. 7, 2003, from http://www.actional.com/products/web_services/index.asp, 3 pages.
Albrecht, C., et al., "Marketplace and Technology Standards for B2B. Ecommerce: Progress and Challenges," MIS Quarterly Special Issue on Standard Making, International Conference on Information Systems, Dec. 2003, Seattle, WA, pp. 188-209, 23 pages.
Allidex, Frequently Asked Questions, retrieved Nov. 4, 2003, from http://www.allidex.com/faq.html, 4 pages.
Amazon.com, Inc., Associates: Enhance Your Site Using Web Services, retrieved Nov. 4, 2003, from http://www.amazon.com/gp/browse.html/ref=sc_bb_1_1/104-7530911-9659969?no=3435361&me=A3.6.L, 2 pages.
Amazon.com, Inc. Developers: Build Solutions for Amazon Partners, retrieved Nov. 4, 2003, from http://www.amazon.com/gp/browse.html/ref=sc_bb_1_1/104-7530911-9659969?no=3435361&me=A3.6.L, 2 pages.
Amazon.com, Inc., Sellers and Vendors: Sell More Using Web Services, retrieved Nov. 4, 2003, from http://www.amazon.com/gp/browse.html/ref=sc_bb_1_1/104-7530911-9659969?no=3435361&me=A3.6.L, 1 page.
Amazon.com, Inc., Web Services FAQ's, retrieved Nov. 4, 2003, from http://www.amazon.com/gp/browse.html/ref=sc_bb_1_0/104-7530911-9659969?no=3435361&me=A3.6.L, 11 pages.
Amazon.com, Inc., Web Services, retrieved Nov. 4, 2003, from http://www.amazon.com/gp/browse.html/104-7530911-9659969?node=3435361, 2 pages.
Amazon.com, Inc., Web Services, "Amazon Elastic Compute Cloud (Amazon EC2)—Limited Beta," retrieved Oct. 13, 2007, from http://www.amazon.com/b/ref=sc_fe_1_2/105-1515636-7955636?ie=UTF8&node=201590011& . . . , 5 pages.
Amazon.com, Inc., Web Services, "Amazon Simple Storage Service (Amazon S3)," retrieved Oct. 13, 2007, from http://www.amazon.com/S3-AWS-home-page-Money/b/ref=sc_fe_1_2/105-1515636-7955636?ie . . . , 5 pages.
Amazon.com, Inc., Web Services, "Amazon Simple Queue Service (Amazon SQS)," retrieved Oct. 13, 2007, from http://www.amazon.com/Simple-Queue-Service-home-page/b/ref=sc_fe_1_2/105-1515636-7955 . . . , 4 pages.

Amazon.com, Inc., "Paid AMIs," retrieved Oct. 13, 2007, from http://docs.amazonwebservices.com/AWSEC2/2007-03-01/DeveloperGuide/Paid_AMIs.html, 1 page.
Amazon.com, Inc., "Paying for AMIs," retrieved Oct. 13, 2007, from http://docs.amazonwebservices.com/AWSEC2/2007-03-01/DeveloperGuide/AESDG-chapter-usi . . . , 2 pages.
Amazon.com, Inc., Web Services, "Tech. Note: Using Paid AMIs and the Demo Paid AMI," retrieved Oct. 13, 2007, from http://developer.amazonwebservices.com/connect/entry.jspa?externalID-866, 2 pages.
Andrews, T., et al., "Specification: Business Process Execution Language for Web Services Version 1.1," IBM developerWorks, May 5, 2003, retrieved Jan. 31, 2005, from http://www-106.ibm.com/developerworks/webservices/library/ws-bpel/, 124 pages.
Binstock, A., "Staking New Territory, Breaking New Ground," retrieved Sep. 9, 2005, from http://archive.devx.com/javaSR/articles/binstock/binstock.asp, 6 pages.
Box, Don et al., "Web Services Policy Framework (WS-Policy)," Jun. 2, 2003, retrieved Sep. 12, 2005, from ftp://www6.software.ibm.com/software/developer/library/ws-policy2003.pdf, 21 pages.
Brown, R., "Epicentric Unveils Web Services E-Hub," Mar. 21, 2001, Line56.com, retrieved Sep. 9, 2005, from http://www.line56.com/print/default.asp?ArticleID=2287, 2 pages.
Bunting, Doug et al., "Web Services Composite Application Framework (WS-CAF)," Jul. 28, 2003, retrieved Sep. 12, 2005, from http://www.oasis-open.org/committees/download.php/4343/WS-CAF%20Primer.pdf, 23 pages.
Burbeck, S., "The Tao of E-Business Services—The Evolution of Web Applications Into Service-Oriented Components With Web Services," Oct. 2000, IBM®, http://www-4.ibm.com/software/developer/library/ws-tao/index.html, 13 pages.
Business Wire, "Desktop.com Introduces Devtop, the First Integrated Platform for Building, Deploying, and Distributing Web-Based Applications," Jun. 26, 2000, retrieved Sep. 8, 2005, from http://www.findarticles.com/p/articles/mi_m0EIN/is_2000_June_26/ai_62915951/print, 2 pages.
Clark, M., "Business Architecture for a Web Services Brokerage—Understanding the Business Context of Web Services," Aug. 1, 2001, retrieved Aug. 2, 2005, from http://www.webservicesarchitect.com/content/artciles/clark01print.asp, 5 pages.
CPA2Biz, Inc., "New Rivio Business Services Suite," Apr. 18, 2001, retrieved Sep. 8, 2005, from https://www.cpa2biz.com/Corp/Press+Releases/PR_WebTools_18APR01.htm, 3 pages.
CPA2Biz, Inc., "Verizon Unveils Rivio Web Services Suite for Small Business Customers," May 29, 2001, retrieved Sep. 22, 2005, from https://www.cpa2biz.com/Corp/Press+Releases/PR_VERIZON_29MAY01.htm, 3 pages.
E2OPEN™, E2open Products, retrieved Nov. 7, 2003, from http://www.e2open.com/products/, 3 pages.
E2OPEN™, The E2open Integration Platform, retrieved Nov. 7, 2003, from http://www.e2open.com/downloads/e2open_integration_platform_datasheet.pdf, 5 pages.
EbizQ, Product Quicktake, retrieved Nov. 7, 2003, from http://www.ebizq.net/reports/1884.html?download=1, 2 pages.
Grand Central™ Communications website, retrieved Nov. 6, 2003, from http://www.grandcentral.com/products/, 2 pages.
Grand Central™ Communications, Frequently Asked Questions, retrieved Nov. 6, 2003, from http://www.grandcentral.com/products/faqs/index_html, 5 pages.
InformationWeek, "Amazon EC2 Lets Users Sell Software as a Service," Aug. 1, 2007, retrieved Oct. 13, 2007, from http://www.informationweek.com/shared/printableArticleSrc.jhtml?articleD=201202196, 1 page.
Irani, R., "Web Services Intermediaries—Adding Value to Web Services," Nov. 21, 2001, retrieved Aug. 2, 2005, from http://www.webservicesarchitect.com/content/articles.irani07print.asp, 5 pages.
Jamcracker, Inc., "Jamcracker announces Pivot Path: Fully integrated software suite for Identity Management," Nov. 11, 2003, retrieved Sep. 12, 2005, from http://web.archive.org/web/20040607054618/http://jamcracker.com/pivot_path_release.pdf, 2 pages.
Khare, R., "Whiz-Bangery, Indeed: Primordial's WSBANG," Nov. 16, 2001, retrieved Sep. 9, 2005, from http://lair.xent.com/pipermail/fork/2001-November/006569.html, 2 pages.

(56) References Cited

OTHER PUBLICATIONS

Lee, Yvonne L., "StrikeIron's Hot for Web Services," *SD Times*, Jun. 1, 2004, retrieved Sep. 12, 2005, from http://www.strikeiron.com/doc/SDTimes060104.pdf, 1 page.

Levitt, J., "From EDI to XML and UDDI: A Brief History of Web Services," Oct. 1, 2001, InformationWeek, retrieved Sep. 9, 2005, from http://www.informationweek.com/story/IWK20010928S0006, 3 pages.

Leymann, F., "Web Services Flow Language (WSFL 1.0)," IBM Software Group, May 2001, 108 pages.

Oasis, UDDI.org, retrieved Sep. 8, 2005, from http://www.uddi.org/find.html, 2 pages.

PayPal.com, Recurring Billing Service: How it Works, retrieved Dec. 5, 2006, from http://www.paypal.com/cgi-bin/webscr?cmd=payflow-recurring-billing-integration-outside, 2 pages.

PayPal.com, Recurring Billing Service: FAQs, retrieved Dec. 5, 2006, from http://www.paypal.com/cgi-bin/webscr?cmd=_payflow-recurring-billing-faq-outside, 3 pages.

Radding, A., "Generating Revenue from Web Services—Six Vendors With the Right Tools," Jan. 20, 2003, retrieved from http://72.14.207.104/search?q=cache:W5EXBA4Lr54J:home.comcast.net/~alanradding/iaws.pdf+generating+revenue+from+web+services+radding&hl=en&gl=us&ct=clnk&cd=3, 4 pages.

Redhat.com, "Red Hat Announces Red Hat Enterprise Linux Available on Demand on Amazon Elastic Compute Cloud," Nov. 7, 2007, retrieved Nov. 19, 2007, from http://www.redhat.com/about/news/prarchive/2007/amazon.html, 3 pages.

Sabre Travel Network, Sabre Travel Network Launches Web Services Capabilities for Agents, Jul. 28, 2003, retrieved Sep. 13, 2005, from http://phx.corporate-ir.net/phoenix.zhtml?c=73098&p=IROL-NewsText&t=Regular&id=435603&logo=logo03, 2 pages.

SalCentral, Subscription of Web Services, Oct. 5, 2003, retrieved Sep. 7, 2005, from http://web.archive.org/web/20031005075820/www.salcentral.com/salnet/wpsubws.htm, 5 pages.

SalCentral, The Napster of Web Services, Oct. 4, 2003, retrieved Sep. 7, 2005, from http://web.archive.org/web/20031004143406/www.salcentral.com/salnet/webservicesnapster.asp, 2 pages.

SalCentral, WSDL, SOAP and Web Services and Quality Assurance and promotion, Oct. 4, 2003, retrieved Sep. 7, 2005, from http://web.archive.org/web/20031004143940/www.salcentral.com/salnet/webservicewhat.asp, 2 pages.

SalCentral, WSDL, SOAP, Web Services Search Engine and Web Service Tracking, Oct. 11, 2003, retrieved Sep. 7, 2005, from http://web.archive.org/web/20031011101544/www.salcentral.com/salnet/webserviceswsdlne.asp, 1 page.

Samtani, G., et al., "Integration Brokers and Web Services—Will Web Services Support Be Just Another Feature?" Jan. 30, 2002, retrieved Aug. 2, 2005, from http://www.webservicesarchitect.com/content/articles/samtani03print.asp, 5 pages.

Schofield, J., "The Third Era Starts Here," *The Guardian*, May 29, 2003, retrieved Nov. 4, 2003, from http://www.guardian.co.uk/print/0,3858,4678440-110837,00.html, 3 pages.

Siddiqui, B., "UDDI Based Electronic Marketplaces—Easier Integration With UDDI and WSDL," Feb. 20, 2002, retrieved Aug. 2, 2005, from http://www.webservicesarchitect.com/content/articles/siddiqui02print.asp, 4 pages.

Sirin, E., et al., "Semi-automatic Composition of Web Services Using Semantic Descriptions," In *Web Services: Modeling, Architecture and Infrastructure workshop in ICEIS 2003*, Angers, France, Apr. 2003, from http://www.mindswap.org/papers/composition.pdf, 6 pages.

Smith, Rick, "Striking While the Iron is Red Hot: Strikelron Unveils Its Web Network," *LocalTechWire*, Jun. 25, 2004, retrieved Sep. 22, 2005, from http://www.localtechwire.com/article.cfm?u=8509, 3 pages.

SoftwareMarkets.com, Frequently Asked Questions from Developers, Sep. 18, 2000, retrieved Sep. 8, 2005, from http://web.archive.org/web/20000918003355/www.softwaremarkets.com/info/faqdevs.html, 3 pages.

Sterling Commerce, Sterling Information Broker, retrieved Nov. 10, 2003, from http://www.sterlingcommerce.com/PDF/Solutions/Sterling/SC0040.InfoBrokerOver.6-02.pdf, 4 pages.

Sterling Commerce, Sterling Information Broker, retrieved Nov. 10, 2003, from http://www.sterlingcommerce.com/solutions/em/commerce/iibs.html, 3 pages.

StrikeIron, Inc., "StrikeIron Launches the Web Services Business Network," Jun. 23, 2004, retrieved Sep. 8, 2005, from http://www.strikeiron.com/news/si_launches.aspx, 3 pages.

StrikeIron, Inc., "StrikeIron Web Services Business Network Overview," retrieved Sep. 12, 2005, from http://www.strikeiron.com/doc/StrikeIronWebServicesBusinessNetworkOverview.pdf, 24 pages.

StrikeIron, Inc., Frequently Asked Questions, retrieved Dec. 5, 2006, from http://www.strikeiron.com/info/faqs_p.aspx, 5 pages.

StrikeIron, Inc., What is Invoke Through Compensation, retrieved Dec. 5, 2006, from http://www.strikeiron.com/info/whatisinvokethrough.aspx, 3 pages.

Taft, Darryl K., "Start-Up Presents ASP Opportunity for Java Developers," *CRN*, Jul. 31, 2000, retrieved Sep. 20, 2005, from http://www.crn.com/sections/breakingnews/breakingnews.jhtml?articleId=18834381, 3 pages.

Tolksdorf, R., et al., "A Web Service Market Model Based on Dependencies," retrieved Sep. 9, 2005, from http://www.wiwiss.fu-berlin.de/suhl/bizer/pub/p49-tolksdorf.html, 4 pages.

UNISYS, Web Service Marketplace, retrieved Nov. 4, 2003, from http://www.unisysfsp.com/default.aspx?catID+16, 2 pages.

W3C, "WS Choreography Model Overview," Mar. 24, 2004, retrieved Sep. 8, 2005, from http://www.w3.org/TR/2004/WD-ws-chor-model-20040324/, 35 pages.

Waldspurger C. A. et al., "Spawn: A Distributed Computational Economy," May 1989, Xerox Palo Alto Research Center, pp. 1-32, 32 pages.

Web Services Architect, Web Services Resources, retrieved Nov. 6, 2003, from http://webservicesarchitect.com/resources.asp, 6 pages.

WestGlobal mScape™, Web Services Business Management System, retrieved Nov. 7, 2003, from http://www.westglobal.com/downloable_media/mscape_literature.zip, 20 pages.

WestGlobal, Products—Overview, retrieved Nov. 7, 2003, from http://www.westglobal.com/products/mscape_overview.htm, 3 pages.

WestGlobal, Products—Revenue Management Module, retrieved Nov. 7, 2003, from http://www.westglobal.com/products/mscape_revman.htm, 3 pages.

Xmethods website, retrieved Nov. 6, 2003, from http://www.xmethods.net/, 3 pages.

ZapThink, LLC, ZapThink Briefing Note—Oct. 8, 2002, retrieved Nov. 7, 2003, from http://www.grandcentral.com/assets/docs/GC.zapthink_report.pdf, 5 pages.

Gonsalves, A., "Amazon Launches Premium Support for EC2 Developers," InformationWeek, Apr. 17, 2008, retrieved on Apr. 17, 2008, from http://www.informationweek.com/shared/printableArticleSrc.jhtml?articleID=207400320, 1 page.

Amazon Web Services, "Amazon Web Services Premium Support (AWS Premium Support)," retrieved on Apr. 17, 2008, from http://www.amazon.com/b/ref=sc_fe_c_1_13833841_1?ie=UTF8&node=566801011&no=138338 . . . , 3 pages.

Nirvanix, "Getting Started," retrieved on Apr. 17, 2008, from http://www.nirvanix.com/gettingStarted.aspx?=homecontent, 2 pages.

Wikipedia, "Digital Rights Management," retrieved on Dec. 23, 2010, from http://en.wikipedia.org/wiki/Digital_rights_management, 20 pages.

"Rogue Wave Wraps Standard C++ Library With Tools.H++ V7.0," Mar. 18, 1996, retrieved on Dec. 23, 2010 from http://thefreelibrary.com/ROGUE+WAVE+WRAPS+STANDARD+C%2B%2B+LIBRAR . . . , 3 pages.

\* cited by examiner

225 — Please Provide Information for Component EEE

223 — Component EEE Textual Description
[                                                  ]

227 — Component EEE Usage Pricing

| Pricing Use Dimension | Component EEE Price | Optional Criteria (e.g. pricing tiers, volume discount, etc.) |
|---|---|---|
| 227a GB-Month of storage used | $0.15 | |
| 227b CPU Hour used | $0.75 | |

229 — Optional Component EEE Monthly and/or One-Time Fees _click here_

233 — Optional Version Information [ 1.3 ]

237 — Optional Component EEE Usage Restrictions _click here_

239 — Provide Component EEE Access Information _click here_

Click _Continue_ to register Component EEE ( Continue ▶ ) — 239

APPLICATION DEPLOYMENT SYSTEM - ACCOUNT ACTIVITY

John Smith - Account Number 1111-1111-1111

Billing Statement as of September 1, 20XX (for charges from August 1 – August 31, 20XX)

Application AAA Execution Summary

| | Rate | Usage | Totals |
|---|---|---|---|
| Component HHH Usage | | | |
| | $0.00030 per request ($0.30 per 1,000 requests) | 15,000 Requests | 4.50 |
| | $0.000015 per search result after the first 20 ($0.15 per 10,000 results) | 30,000 Results | .45 |
| | $1 per CPU hour | 15.5 hours | 15.50 |
| | $0.00030 per equivalent simple query ($0.30 per 1,000 equivalent simple queries) | 6,000 Queries | 1.80 |
| | | TOTAL | 22.25 |

Component EEE Usage

Version 1.3 (08/01/XX – 08/11/XX)

| | | | |
|---|---|---|---|
| | $0.75 per CPU hour | 17.2 hours | 12.09 |
| | $0.15 per GB-Month of storage used | 30.7 GB-Mo | 04.61 |

Version 1.4* (08/12/XX – 08/31/XX)  * Not available for use outside of the U.S.

| | | | |
|---|---|---|---|
| | $0.80 per CPU hour | 35.2 hours | 28.16 |
| | $0.15 per GB-Month of storage used | 62.3 GB-Mo | 09.35 |
| | | TOTAL | 54.21 |

Other Application AAA Usage

| | | | |
|---|---|---|---|
| $0.48 per CPU hour (large instance) | | 243.8 hours | 117.02 |
| $0.10 per GB-Month of storage volume usage | | 127.7 GB-Mo | 012.77 |
| | | TOTAL | 129.79 |

Total Charges due by October 1, 20XX (view details regarding taxes) $206.25

*Fig. 3*

MANAGING USE OF SOFTWARE COMPONENTS

BACKGROUND

Various mechanisms exist to allow computers and executing software applications to interact. For example, remote procedure call ("RPC") protocols have long existed that allow a program on one computer to cause a program on another computer to be executed. In a similar manner, various object-oriented architectures such as CORBA ("Common Object Request Broker Architecture") and DCOM ("Distributed Component Object Model") provide remote execution capabilities. In addition, various middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the World Wide Web ("Web") has provided additional opportunities for computers to inter-communicate. For example, much current Web use involves users interactively requesting Web pages from Web servers (e.g., via Web browser applications executing on user computers) and receiving the requested information in response. In addition, there is also growing use of the Web to support the programmatic interaction of remote applications to exchange information via defined APIs ("application program interfaces"), such as via Web services. Web services allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

In addition to interactions between multiple software applications, various mechanisms also exist to allow a particular software program to incorporate or otherwise use other portions of software code that are not stand-alone programs. For example, some implementations of software programming languages allow a software application to link to or otherwise incorporate one or more software libraries that each typically includes multiple available software functions and/or class definitions, usually of a common type or a related purpose. In additions, some implementations of software programming languages allow the definition and use of other types of reusable software packages that can be incorporated in or otherwise used by various software applications, such as JavaBeans within the Java programming language, and OLE (Object Linking and Embedding) objects and ActiveX controls.

BRIEF DESCRIPTION OF THE DRAWINGS

FIGS. 2A-2C illustrate examples of managing execution of a software application that uses software components.

FIG. 3 illustrates an example of a summary of fees from execution of a software application that uses fee-based software components.

DETAILED DESCRIPTION

Techniques are described for facilitating use of software components by software applications in a configurable manner. In at least some embodiments, the software components are fee-based components that are made available by providers of the components for use by others in exchange for fees defined by the component providers, and in at least some embodiments and situations, the software components may have various associated restrictions or other non-price conditions related to their use. Various types of software components may be provided and used in various embodiments, as discussed in greater detail below. The described techniques facilitate use of such software components by software applications, such as in a manner configured by the creators of the applications. Furthermore, in at least some embodiments, the execution of such software applications is managed by an application deployment system that controls and tracks the execution of the software application on one or more computing nodes, including to manage the execution of any software components that are part of the software application. The described techniques are performed in at least some embodiments by one or more of an automated Configurable Component Usage System and an automated Application Deployment System, as described in greater detail below.

Figure 1:
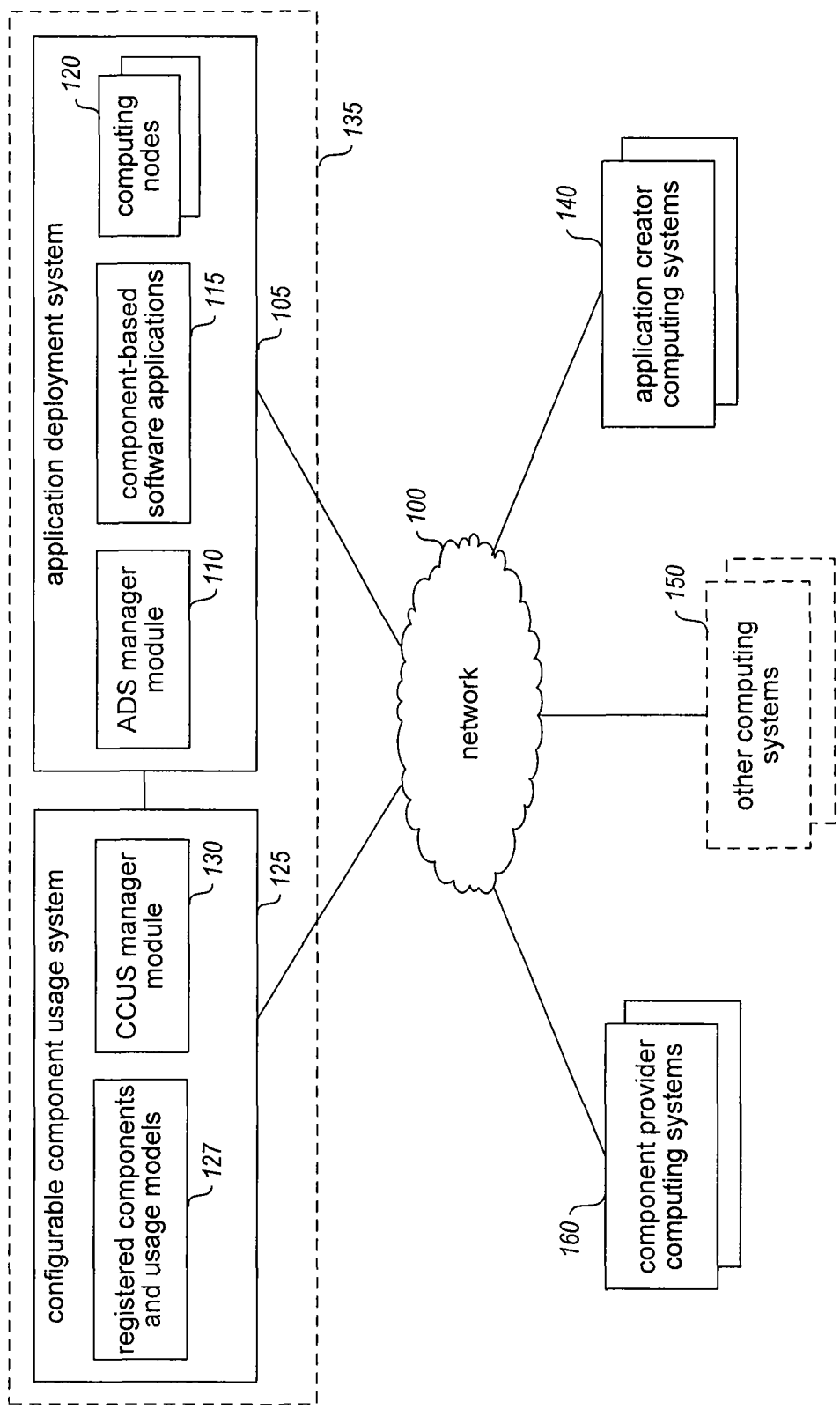
FIG. 1 is a network diagram illustrating an example embodiment of interactions to manage execution of software applications that use software components.

FIG. 1 is a network diagram that illustrates an example of an application deployment system 105 that manages execution of software applications on various available computing nodes, including for component-based software applications that each use one or more software components from providers other than the creators of the software applications. FIG. 1 further illustrates an example of a configurable component usage system 125 that automatically manages providing software components for use by software applications being executed by the application deployment system 105. In the illustrated embodiment, the application deployment system 105 and the configurable component usage system 125 are integrated together into a single system 135 (e.g., provided by a single entity, not shown), but in other embodiments may have other forms (e.g., being separate systems operated by separate entities, being in the form of a single system that includes at least some of the described functionality of both the application deployment system and the configurable component usage system, etc.). In addition, for illustrative purposes, some examples and embodiments are described below in which specific types of software components and software applications are provided, managed and executed in specific manners. Furthermore, while execution of a single software application having multiple portions or pieces is discussed in some examples, it will be appreciated that such descriptions similarly apply to groups of two or more software applications that are designed or configured to inter-operate, as well as to a single software application that is executed in a distributed manner by executing multiple copies of the software application that inter-operate or otherwise each perform a subset of the total functionality that is provided by the software application. These examples are provided for illustrative purposes and are simplified for the sake of brevity, and it will be appreciated that the inventive techniques may be used in a wide variety of other situations, only some of which are described below.

In the example of FIG. 1, various component provider users (not shown) use various client component provider computing systems 160 to interact over a network 100 with the configurable component usage system 125, which is provided by one or more other configured computing systems (not shown). In this example, at least some of the functionality of the configurable component usage system 125 is provided by a CCUS ("configurable computing usage system") manager module 130 of the configurable component usage system 125, and other related functionality may optionally be provided by other modules (not shown) of the configurable component usage system 125. In particular, the various component provider users interact with the module 130 in order to provide software components that are available for use with component-based software applications, including to supply at least one usage model for each software component being provided. As discussed in greater detail below, each usage model associated with a software component may optionally specify one or more price conditions related to use of the software component (e.g., usage-based prices that correspond to a specified cost for a specified amount of use of the software component), and may optionally specify one or more non-price conditions related to use of the software component (e.g., geographical restrictions on where the software component may or may not be used, allowed or disallowed types of uses, etc.). After the module 130 receives the various information for a particular software component, the module 130 registers the software component as being available for use by third-party software applications, including to store information 127 that includes the associated usage model(s) and information on how to access the software component (e.g., by obtaining and storing a copy of the software component, by obtaining and storing information about a network-accessible location from which the software component may be retrieved when desired, etc.). The module 130 may also optionally provide information to one or more other systems (e.g., the application deployment system 105) about the registered software components at various times and in various manners (e.g., by pushing some information to another system periodically or at other times, such as upon registration of a software component; by providing information to another system upon request; etc.).

In the example of FIG. 1, various application creator users (not shown) are also using various client application creator computing systems 140 to interact over the network 100 with the application deployment system 105, which is provided by one or more other configured computing systems (not shown). In this example, at least some of the functionality of the application deployment system 105 is provided by an ADS ("application deployment system") manager module 110 of the application deployment system 105, and other related functionality may optionally be provided by other modules (not shown) of the application deployment system 105. In particular, the various application creator users interact with the module 110 in order to specify information about component-based software applications to be executed that each use one or more third-party software components, including in some embodiments to specify sufficient additional software code for the software applications to enable the application deployment system 105 to generate executable copies of the software applications. Some or all of the software components used by the software applications may be software components registered with the configurable component usage system 125, although in some embodiments other external software components may be supplied or indicated by the application creator users (e.g., other optional software components, not shown, that are available over the network 100 from optional other computing systems 150). As part of preparing a software application for execution, the module 110 may, for example, enable particular application creator users to specify quantities of computing nodes to be used in the execution of a software application and/or to specify particular portions of the software application (e.g., particular objects, modules, or functions within the software application) to be executed together with or separate from other such software application portions, although in other embodiments the application deployment system 105 may instead automatically determine some or all such information without such user input. After the module 110 receives the various information for a particular software application, the module 110 stores information 115 about the software application, including in some embodiments and situations to generate an executable version of the software application that is stored for immediate and/or later use.

In this example, the application deployment system also makes various computing nodes 120 available for executing software programs, although in other embodiments at least some of the computing nodes used for such execution may be provided in other manners (e.g., made available by the application creator users or by other users on whose behalf execution of a software application is performed; made available by one or more fee-based program execution services that execute software applications, not shown, such as optionally a program execution service that is integrated in the system 135 or otherwise provided by a single entity that provides system 135; made available by other third-party entities, such as via optional external computing systems 150; etc.). In addition, one or more modules of the application deployment system 105 may assist in continuously or repeatedly monitoring computing nodes that are in use executing software programs, including to determine amounts of use to enable fees to be determined for using particular software components and/or to determine whether particular non-price conditions associated with particular software components are satisfied.

The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users, such as if the systems 105 and/or 125 are provided to support users of that private network. In still other embodiments, the network 100 may include one or more private networks with access to and/or from the Internet. In the illustrated embodiment, the modules 110 and 130 may each include software instructions that execute on one or more computing systems (not shown) to configure those computing systems to perform some or all of the described techniques. In addition, the modules and various computing nodes 120 may be provided in various manners, such as at a single data center or otherwise to use a group of co-located computing systems, or instead in a distributed manner using various computing systems in various distinct geographical locations.

In some embodiments, the illustrated computing nodes 120 may include multiple physical computing systems and/or multiple virtual machines that are hosted on one or more physical computing systems. Each of the computing nodes 120 has some amount of computing resources available for executing one or more programs, which provide a specific amount of program execution capacity, such as may be measured, for example, by a quantity of one or more such computing nodes and/or by a combination of one or more of processing capacity (e.g., number and/or size of processing units), memory capacity, storage capacity, network bandwidth capacity, etc. In some embodiments, preconfigured computing nodes may be used, with each preconfigured computing node having equivalent or otherwise similar amounts of resources available for executing programs on behalf of users, while in other embodiments, a selection of various different computing nodes having varying amounts and/or types of computing resources (e.g., size, speed and/or type of processing units; number of processing units; amount of memory and/or storage; platform configuration, such as 32-bit or 64-bit; etc.) may instead be used. Furthermore, when computing nodes vary based on geographical location and/or other characteristics, particular computing nodes may be chosen and used to execute a particular software application for various reasons, including to satisfy conditions of any software components that are used as part of the software application.

In this illustrated embodiment, after an application creator user has interacted with the application deployment system to specify a component-based software application, the application creator user (or optionally another user, such as if the application creator user has authorized that other user or otherwise made the software application available for use by the other user) may interact with the application deployment system to initiate execution of the software application using one or more computing nodes 120—in some embodiments and situations, the interactions to initiate execution of a software application may occur as part of the same interactions to specify the software application, while in other embodiments and situations the interactions to initiate execution of the software application may occur at later times. After a request is received from a user to execute a software application, the module 110 may determine whether there are a sufficient number of computing nodes 120 with available resources for satisfying the request, and if so, the module 110 may initiate execution of the software application on an appropriate amount of the computing nodes on behalf of the user. In some embodiments and situations, the application deployment system will select one or more particular computing nodes for the execution of a software application, including to satisfy any specified conditions for any software components used by the software application (e.g., conditions related to geographical locations of the computing nodes executing such software components and/or of computing nodes receiving output generated by such software components). The managing of the execution of the software application on one or more computing nodes may also include automated operations by the application deployment system to prepare those computing nodes, including to provision each of the computing nodes appropriately (e.g., to load at least a portion of the software application on each computing node, optionally including one or more software components used by the software application, such as if that portion of the software application is not already loaded on the computing node), as well as to initiate execution on each of the computing nodes of the portion of the software application that is loaded on the computing node. In at least some embodiments, the application deployment system will manage the entire execution lifecycle of the software application, including to shutdown or release the use of computing nodes after execution has completed on those computing nodes, to optionally temporarily pause the execution of particular software on particular computing nodes (e.g., while waiting for data or for other reasons), to optionally monitor the execution on each computing node (e.g., to track an amount of use of particular software components, to verify that any conditions associated with particular software components are satisfied during execution, etc.), and to optionally restart or replace computing nodes that fail or otherwise become unavailable before their software execution is complete.

In addition, in some embodiments, the application deployment system may take additional actions to determine one or more fees to charge a user for executing a software application, and optionally obtain payment from the user for those fees, whether before or after the execution is performed. For example, a user may be charged various fees to use a software component during execution of a software application by the application deployment system, such as based on a number of copies of the software component that are used, a duration of time that the software component is used, particular operations that the software component performs (e.g., data transfer and/or storage), etc. Similarly, a user may in some embodiments be charged various other fees in association with use of the application deployment system to execute a software application, such as based on a number of computing nodes used, a type of computing node used, a duration of time the computing nodes are used, particular operations that the computing nodes perform (e.g., data transfer and/or storage), particular functionality or features provided by the application deployment system, etc.

After a group of one or more computing nodes is provided for use in executing a software program on behalf of a user, the computing node group may be further managed in various manners in at least some embodiments. For example, as previously noted, the application deployment system module 110 may optionally monitor the computing nodes of the group, such as to determine performance characteristics of some or all of the computing nodes, including an actual computing node quantity or other measure of actual program execution capacity being provided by the computing nodes of the group. The actual program execution capacity of the group may change if, for example, one or more of the computing nodes fail or otherwise become unavailable, and in at least some embodiments, the application deployment system 105 may perform various operations to maintain the program execution capacity of the computing node group in such situations (e.g., by initiating the addition of replacement computing nodes to the group in place of the unavailable computing nodes). In embodiments in which some or all of the computing nodes being used are instead provided by a program execution service, some or all of such monitoring of computing nodes and/or management of the execution of a software program and/or determination of related fees may instead be performed by the program execution service, with corresponding information made available by the program execution service to the application deployment system.

Although the foregoing example embodiment of FIG. 1 is described with respect to a application deployment system that provides various types of functionality for various users in conjunction with an associated configurable component usage system, it will be appreciated that various other embodiments may exist. For example, in at least some embodiments, a program execution service will be used to assist in the execution, as noted above. In addition, while not illustrated, some users or other entities may serve multiple roles. For example, an application creator user may also provide one or more software components that are available for use by other users. As another example, in some embodiments the entity providing the configurable component usage system and/or application deployment system may also create and provide one or more software components. In addition, some of the users may represent an organization or other group (e.g., a company) instead of an individual.

Software components that are used by applications may be of various types in various embodiments, with a non-exclusive list of types of software components including software libraries, JavaBeans, ActiveX controls, scripts, objects, etc. Such software components may similarly provide a variety of types of capabilities and functions to software applications that use the software components. In addition, as noted above, a user who provides or is otherwise associated with a software component may in some embodiments interact with the configurable component usage system to configure pricing and other information for use of the software component by other software applications, such as to specify one or more alternative or complementary configured usage models that correspond to use of the software component by a software application. For example, a software component may define pricing conditions that are based on an indicated amount of use of one or more use dimensions (e.g., an indicated price for each use of the component; an indicated price per amount of time of use; an indicated price per unit of processing time; an indicated price per unit of storage used; an indicated price per unit of data transferred in; an indicated price per unit of data transferred out; an indicated price for a predetermined number of times of use in a predetermined period of time, etc.), such as to reflect an amount of computing resources used by the software component when executing. The user who performs the configuration for a software component may be a component developer user or other user that is involved in creation of the component, or another user otherwise associated with the component (e.g., a distributor or other provider of the component).

Software applications that use such software components may similarly be of a variety of types in various embodiments, including, for example, client-side application programs designed to execute on computing devices of end users, server-based applications that end users may access using remote client devices (e.g., Web applications accessed via a Web browser executing on a client device of an end user), etc. The software applications may further include applications with a graphical user interface (e.g., desktop applications or Web applications), a command-line interface (e.g., for a system utility), or a programmatic interface. In addition, in some embodiments, the applications may be an executable software image. Such executable software images may, for example, be virtual machine images (e.g., images that are bootable or otherwise loadable by a virtual machine and that each include operating system software and/or software for one or more application programs).

To perform the configuration for a component, in at least some embodiments, a component creator user (or other user) interactively configures a usage model for each selected component to correspond to use of the component via the component, with a partial example of such configuration being shown with respect to FIG. 2A. A configured usage model for a component may include a variety of pricing terms and other information related to use of the component, such as a configured indicated price for a configured indicated amount of use of a configured indicated use dimension (e.g., an indicated price for each use of the component, an indicated price per amount of time of use, etc.). In addition, in some situations a software application that later uses a selected component may be a fee-based application that has a predefined usage model that specifies fees for use of the application, such as with pricing terms specified by a creator of the application. If so, pricing for using the component via the application may differ from the predefined usage model for the component in one or more ways, such as by having a differing use price, a differing amount of use, and/or a differing use dimension (e.g., to specify different configured prices for the same amount of use of the same use dimension, such as higher configured prices; to specify configured prices for one or more new custom use dimensions that are not used by the underlying component; to specify configured prices for a different amount of use of the same use dimension; etc.).

In addition, a configured usage model for a particular component may further include conditions that specify other types of criteria or other information in at least some embodiments, such as access criteria to control which other users are allowed to execute that component (e.g., to indicate that all other users are allowed, to indicate particular users that are allowed and/or excluded, to indicate groups of users that are allowed and/or excluded, to indicate characteristics of users that are allowed and/or excluded, etc.) and/or to indicate other conditions under which execution of that component is allowed or not allowed (e.g., conditions related to day and/or time, conditions related to a type of use of the executing component, conditions related to geographical locations, conditions related to types of applicable taxes or other regulatory legal schemes, etc.).

In at least some embodiments, the configurable component usage system and application deployment system may further support having multiple versions of at least some software components. In some such embodiments, the multiple versions may share a single configured usage model, while in other such embodiments each such software component version may have a distinct configured usage model (e.g., with distinct pricing and/or distinct non-pricing conditions). When multiple versions of a software component are available, the configurable component usage system and application deployment system may in some embodiments perform automated operations to cause the most recent or upgraded version of the software component to be used, such as to present only the most recent version as an option for use in new software applications being created, and/or to update existing software applications that previously used an earlier version of the software component so that they use the most recent version (e.g., by incorporating the most recent version of the software component the next time that execution of the software application begins; by updating the software application to use the most recent version while the software application is in use, such as by dynamically linking or otherwise adding the most recent version; etc.). Alternatively, in other embodiments, when multiple versions of a software component are available, the configurable component usage system and application deployment system may in some embodiments perform automated operations to enable some or all of the versions of the software component to be used, such as to present only multiple versions as an option for use in new software applications being created, to update existing software applications that previously used an earlier version of the software component so that they use the most recent version only when instructed by the user, to automatically choose between multiple versions of the software component based on one or more of various factors (e.g., compatibility with other software components being used in a software application, to select a version with lowest pricing, to select a version whose conditions in an associated usage model may be satisfied for execution of the software application, etc.).

In addition, the application deployment system may perform various operations to manage execution of a component-based software application, including to load at least a portion of the software application onto each of one or more computing nodes to be used for the execution. The loading of such software onto a computing node may be performed in various manners. For example, in some embodiments, a software image may be created that includes all of the desired software (optionally including one or more software components to be executed on the computing node), and that created software image may be distributed to the computing node (e.g., over a network, such as dynamically at a time of the request for execution or instead in advance of an execution request; via storage on a computer-readable storage medium, such as in advance of an execution request; etc.). The distributed software may further be stored on local non-volatile storage of the computing node, or in some embodiments, if applicable, maintained instead on the computer-readable storage medium on which the software was distributed. In other embodiments, a logical storage volume may be created on which the software is stored, and the storage volume may be mounted on the computing node (e.g., dynamically at a time of a request for execution or instead in advance of an execution request) to enable the software to be accessed from it. Additional details related to the use of such logical storage volumes are included in U.S. patent application Ser. No. 12/188,943, filed Aug. 8, 2008 and entitled "Providing Executing Programs With Reliable Access To Non-Local Block Data Storage," which is hereby incorporated by reference in its entirety.

In addition, in some embodiments the configurable component usage system and/or application deployment system may charge various fees for the functionality that they provide. For example, the configurable component usage system may charge a fee to a component creator user for providing capabilities to allow the component creator user to specify one or more configured usage models for a software components, such as a one-time fee, a fee for each time that the software component is integrated into a software application and/or executed, etc. Similarly, the application deployment system may charge a fee to an application creator user for integrating a software component into a software application, for executing a software application, for providing capabilities to meter usage of software components during execution, etc. Additional details related to configuring prices and usage models are included in U.S. patent application Ser. No. 11/618,469, filed Dec. 29, 2006 and entitled "Providing Configurable Pricing For Use Of Invocable Services By Applications," which is hereby incorporated by reference in its entirety.

Figure 2B:
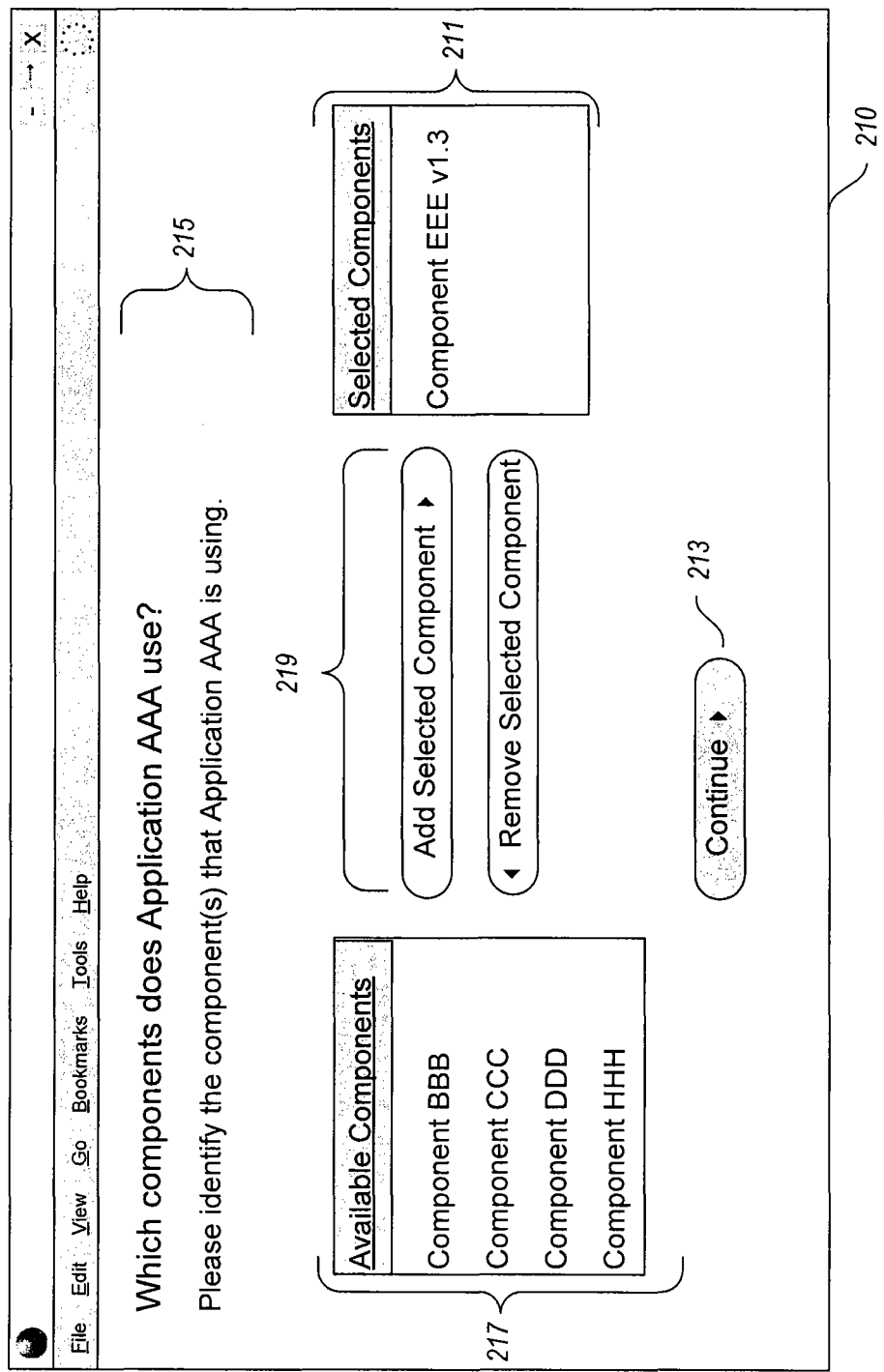
Figure 2C:
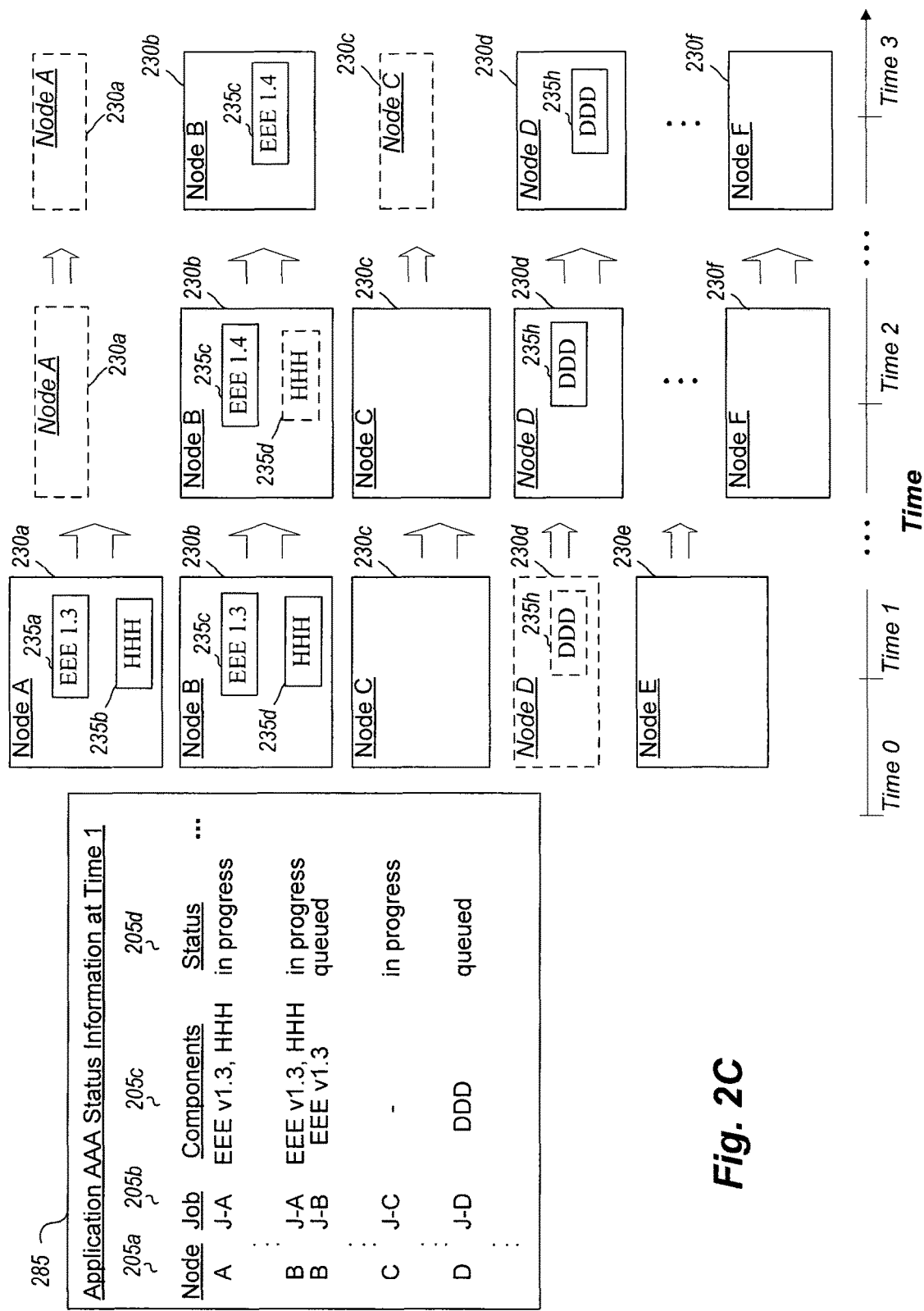

FIGS. 2A-2C illustrate examples of managing execution of a software application that uses software components.

In particular, FIG. 2A illustrates an example user interface screen 220 that may be displayed to a software component provider user by the configurable component usage system to enable the user to register a software component with the configurable component usage system for later use by others' software applications, such as via a Web browser executing on a client computing device of the user or other software executing on the client computing device. In this example, the user interface 220 includes an instruction section 225, a section 223 for specifying a textual description of the software component (e.g., for later display to application creator users who are considering use of the software component), a section 227 for optionally configuring use prices for the software component, and a section 229 for optionally configuring recurring (e.g., monthly) and/or one-time fees. The example user interface further includes optional sections 233 and 237 to allow the user to optionally specify version information (if appropriate) for the software component and to optionally specify one or more non-price conditions of use, respectively. Finally, the example user interface includes a section 239 via which the user supplies a copy of the software component or otherwise enters access information for obtaining the software component, and a user-selectable control 239 for submitting the software component to the configurable component usage system for registration. Any information specified in sections 227, 229 and 237 will be part of the configured usage model for the software component. In this example, section 227 includes rows 227a and 227b, with each row corresponding to a distinct use dimension. User-specifiable fields are present to allow the user to specify a distinct configured use price with respect to each use dimension, as well as to specify further optional criteria related to the prices. While not illustrated, similar types of input mechanisms may be illustrated for sections 229 and/or 237.

It will be appreciated that various other types of information may be specified in other embodiments (e.g., information about one or more categories or types of the software component), that at least some of the illustrated types of information may not be gathered in other embodiments, and that some or all such information may be obtained in other manners in other embodiments (e.g., via programmatic interactions with a computing system of the user, such as based on supplying the information via one or more APIs (application programming interfaces) provided by the configurable component usage system for that purpose; based on user selection from multiple predefined alternatives; etc.). For example, as noted above, various criteria may be specified by the user for a use price, such as to allow the user to specify complex configured use prices for a software component. For example, complex configured use prices for a software component may include alternative types of pricing to be used under different specified criteria, such as the following: using a first configured use price if a first set of one or more criteria apply, and using a second configured use price if a second set of one or more criteria apply; using configured use prices that are based on an aggregation of usage of multiple types (e.g., based on different tiers or other levels of the aggregate usage); etc. As one example, tiered use prices may be used to provide volume discounts to high-volume users of a software component, or alternatively to provide a limited amount of use for free or at a discount. When tiered use prices are used, they may be specified in various manners, including by specifying information regarding how a tier-based usage model is structured, such as the start and end of various tiers (e.g., in units of the use price for the service, or in terms of conditions such as times for peak/off-peak pricing), whether the tiers are cumulative, etc. In addition, if multiple software components are submitted by a single user, similar information may be displayed to the user for each of the software components, or alternatively, such information may be displayed to the user for a group of multiple selected software components to be registered together, and optionally used by software applications together. Furthermore, in some embodiments and situations, the specified one or more non-price conditions of use 237 may indicate a dependency or other inter-component relationship between the component being registered and one or more other indicated components, such as to specify that the current component and such indicated components are affiliated components to be executed together or have another defined relationship. In some such situations, the configured pricing conditions 227 and/or 229 of the current component may be independent of any such affiliated components, such that an application that uses the current component and pays fees corresponding to the configured pricing conditions 227 and/or 229 will also pay other separate fees for use of the other affiliated components if those affiliated components also have configured pricing conditions for use. Alternatively, in some such situations, the configured pricing conditions 227 and/or 229 of the current component may be inclusive of any such other affiliated components, such that an application that uses the current component and pays fees corresponding to the configured pricing conditions 227 and/or 229 has by doing so also accounted for the use of the other affiliated components (if those affiliated components also have configured pricing conditions for use)—for example, the current component may be configured to invoke or otherwise interact with the other affiliated components during execution, and the configured pricing conditions 227 and/or 229 may be specified in a manner intended to cover the cost of such use of those affiliated components by the current component, with revenue received based on the configured pricing conditions 227 and/or 229 for the current component being used to pay provider(s) of the other affiliated component(s) for the cost of their use by the current component. Additional details related to configuring usage models for use of a service or a component that itself uses one or more other services or components are included in U.S. patent application Ser. No. 14/618,486, filed Dec. 29, 2006 and entitled "Providing Configurable Use By Applications Of Sequences Of Invocable Services," which is hereby incorporated by reference in its entirety.

FIG. 2B illustrates an example user interface screen 210 that may be displayed to an application creator user by the application deployment system to enable the user to specify one or more software components that will be integrated in or otherwise used with the user's software application being created, such as via a Web browser executing on a client computing device of the user or other software executing on the client computing device. In particular, in this example, the user interface screen 210 enables the application creator user to select one or more registered software components from one or more other component providers for use by the software application, such as based on information obtained by the application deployment system from the configurable component usage system about registered software components. In particular, user interface 210 includes an informational section 215, a list 217 of available software components for the application, a list 221 of selected software components for use by the application, user-selectable controls 219 for selecting and deselecting software components, and a user-selectable control 213 to submit the list of the selected software components to the application deployment system as part of the software application creation. Additional information may be available for each of the available software components in some embodiments, such as a description of the component, pricing information, non-price condition information, category or type information, version information, ratings or other assessment information, etc. Although only one software component is selected in this example, multiple software components, including multiple components from different component providers, may be used by the software application. The information displayed in user interface 210 may be displayed, for example, after the user has specified a subset of the registered software components of interest to which the displayed software components correspond (e.g., based on searching, browsing, indicating a category or type, etc.). In addition, while not illustrated here, the user may specify a variety of additional information as part of creating the software application, including additional software code, relationships between a selected software component and other software in the software application, etc. Furthermore, if the selected component (Component EEE version 1.3) has been configured to have an affiliated component (e.g., Component HHH) to be executed along with the selected component, the use of such affiliated components may be handled in various manners, such as by automatically selecting the affiliated component(s) when the selected component is indicated, by providing instructions to the user that use of the selected component requires that the user also select the affiliated component(s) for use, etc. It will be appreciated that the described techniques may be used with a variety of types of software development environments and techniques.

After a component-based software application has been created by an application creator user, the application deployment system may manage execution of the software application, including tracking use of the included software components and optionally verifying whether specified conditions for those software components are satisfied. In particular, FIG. 2C illustrates an example of executing a component-based software application over time, as well as various example status information 285 that may be tracked and maintained for the execution, with the status information corresponding to a particular example time of Time 1. In the example of FIG. 2C, a group of multiple computing nodes 230 are participating in the execution of the example software application, which is referred to as Application AAA, and it includes example registered software component EEE version 1.3 (as previously discussed with respect to FIGS. 2A and 2B), as well as additional example registered software components HHH and DDD. The status information 285 may reflect information that is gathered by automatic monitoring by the application deployment system and/or reported by particular computing nodes. The status information 285 may be stored and used in various manners, including to determine fees for use of fee-based software components. In this example, component HHH has been configured to be an affiliated component for component EEE version 1.3, and thus the execution of those two components is performed together in this example.

The status information 285 includes various execution state information at Time 1 in this example, which reflects a time that is shortly after execution of Application AAA has been initiated (e.g., 10 minutes). In this example, Node D 230*d* has not yet begun executing any execution jobs for Application AAA, such as if Node D is still being provisioned and/or initialized (e.g., is still obtaining input data to be used, is still obtaining software code corresponding to one or more execution jobs to be executed on Node D, is still configuring the software code before execution begins, etc.), or has encountered one or more problems (e.g., a failure or other unavailability, a bottleneck caused by another executing program, etc.), although the computing node may optionally already have a loaded copy of software component DDD 235*h*. While each computing node has at least a portion of the software code of Application AAA loaded, software code of Application AAA that is separate from the registered software components is not illustrated in this example. The other computing nodes 230 that are included in the initial group for executing Application AAA have already begun their respective parts of the execution at Time 1, with those other nodes being Node A 230*a*, Node B 230*b*, Node C 230*c*, and Node E 230*e*. In addition, in this example, each line or entry in the information 285 corresponds to the performance of a particular execution job on a particular computing node, with information being tracked that in this example includes an identification 205*a* of the computing node, of the execution job 205*b*, of any registered software components being used 205*c*, of the status of performance 205*d* of the execution job, and optionally of various other information 210*g*. Such other status information may include, for example, an amount of time that each computing node and/or software component has been executing, a time at which each computing node and/or software component begins to execute, a time at which each computing node and/or software component finishes executing, information about dependencies or other inter-relationships between execution jobs (e.g., execution job J-B cannot be executed until after execution job J-A is completed, execution jobs J-C and J-E are to be executed simultaneously, etc.), information about dependencies or other inter-relationships between software components being executed (e.g., to indicate affiliated components), information about expected completion of performance of an execution job being performed (e.g., an expected completion time, an expected amount of time until completion, a percentage completion of an operation, a percentage of the operation that remains to be performed, etc.), information about expected initiation of performance of execution jobs that are not yet being performed, etc.

FIG. 2C further illustrates the changing status of the execution of Application AAA over time. In particular, the left portion of the illustrated timeline corresponds to Time 0 and Time 1, and thus the left-most graphical depictions of the computing nodes 230 correspond to the status information 285. Similarly, the status of the execution at Time 2 is illustrated in the center of the displayed timeline. In this example, the progression of the distributed execution on the various computing nodes 230 has progressed, including that Node D is now participating in the ongoing execution, but the execution of software on Node A for Application AAA has stopped (e.g., the execution of those software components and any other related portion of software for Application AAA has completed its assigned execution jobs). In addition, some other modifications have also been automatically made to the ongoing execution since Time 1 in this example. In particular, Node C has experienced slower performance than expected (e.g., based on Node C having less available computing resources as compared to other computing nodes 230; based on a bottleneck being created on a host physical computing system, not shown, that provides Node C, such as by another computing node provided by that host physical computing system as part of the distributed execution of another program; etc.), and the overall distributed execution may be taking longer than expected (e.g., based solely on the unexpected delay with respect to Node C, based on unexpected slowness of one or more computing nodes 230 other than Node C; etc.). Accordingly, the automated deployment system has automatically added a new computing node Node F 230*f* to the group, and in this example has distributed a portion of the execution job that was previously assigned to Node C to now be performed by Node F. In addition, after the execution of Application AAA begins, the provider of component EEE has in this example released a new upgraded version 1.4 of component EEE, which may optionally have different pricing conditions, and has different non-pricing conditions of use in this example that include component HHH no longer being an affiliated component for upgraded version 1.4 of component EEE. Accordingly, in this example, the embodiment of the application deployment system that is executing Application AAA has automatically updated the version of component EEE that is being used on Node B at Time 2 to upgraded version 1.4 (e.g., after execution job J-A is completed, but before a next execution job is performed using Node B), and has halted the use of component HHH since it is no longer needed as an affiliated component, with component HHH optionally being removed from Node B. In other embodiments, the use of upgraded version 1.4 of component EEE may occur in other manners, such as to wait until a next execution of Application AAA begins to incorporate the upgraded component version, to wait until the application creator user for Application AAA requests or otherwise approves the use of the upgraded component version, etc. In other embodiments and situations, a provider of a component may change pricing conditions and/or non-pricing conditions for a component without changing the version of the component, including while the component is being used as part of one or more software applications, and if so the application deployment system(s) may similarly take automated actions to incorporate use of the new conditions in various manners (e.g., during the ongoing execution of those software applications; during the next execution that is initiated for those software applications; after an application creator user for such an application has requested or otherwise approved the use of the changed conditions for the component, such as optionally after prompting by the application deployment system; etc.).

FIG. 2C further illustrates the status of the execution for Application AAA at a later Time 3, which is illustrated on the right side of the illustrated timeline. In the illustrated example, much of the distributed execution has been completed, and the automated deployment system is gradually ramping down the ongoing distributed program execution. In particular, at Time 3, Node C has joined Node A in having completed its portion of the distributed execution. Accordingly, while other computing nodes 230 continue the ongoing distributed execution X at Time 3, the automated deployment system has automatically stopped the use of Node A and Node C. In addition, in this example, component HHH has been removed from Node B by Time 3. Thus, in this manner, the automated deployment system may automatically manage and track the ongoing distributed execution and the corresponding computing node(s) used for that distributed execution at various times and for various reasons.

FIG. 3 illustrates an example of a summary of fees from execution of a software application that uses fee-based software components. In particular, in this example the illustrated information 345 corresponds to the execution of Application AAA as discussed with respect to FIG. 2C, as well as additional subsequent execution of Application AAA. In addition, the example information 345 is displayed to the application creator user for Application AAA by the application deployment system to indicate usage fees that correspond to the aggregate use of Application AAA during a month period of time, as shown in section 349 of the illustrated information. While not illustrated here, in some embodiments the application creator user may have previously specified a monetary budget for use with Application AAA (e.g., a maximum amount for a specified period of time or for the lifetime of use of Application AAA; a threshold amount that triggers a notification to the application creator user, such as to allow the application creator user to specify a higher amount if so desired; etc.), and if so information about the budget may be reported in the information 345 and/or may be enforced or otherwise monitored by an embodiment of the application deployment system during execution of Application AAA, including providing notifications to the application creator user regarding the budget if the application creator user has so configured the budget.

In this example, the information 345 indicates that the account activity statement corresponds to a monthly billing period for August 20XX. Sections 343 and 341 each correspond to a distinct software component that was used by the execution of Application AAA, and section 348 illustrates additional fees that are not specific to the included software components. While Application AAA also uses software component DDD in the example of FIG. 2C, no corresponding fees are illustrated in FIG. 3, such as if component DDD does not have any associated fees, or the use of component DDD was not sufficient to trigger any configured fees. In particular, section 341 corresponds to component EEE, and in this example includes information sections 341*a* and 341*b* that correspond to different versions of component EEE. In particular, in this example, section 341*a* corresponds to use of version 1.3 of component EEE, including with respect to the example of FIG. 2C, while section 341*b* corresponds to later use of version 1.4 of component EEE by Application AAA after the component is upgraded. As is illustrated, the configured usage models for the two versions may have different prices (e.g., with respect to the cost of each CPU-hour), and version 1.4 of component EEE also has a new non-price condition that limits its use to within the boundaries of the geographical area of the United States. For example, component EEE version 1.4 may include software code that is not allowed to be used outside the U.S. (e.g., due to export restrictions), or software code that is not useful outside the U.S. (e.g., if the software component is a software library to assist in calculating sales tax, with version 1.3 including information for various countries throughout the world, but with version 1.4 including information only for the U.S.). Thus, in some situations, the use of component EEE version 1.3 may be discontinued after the upgrade, while in other embodiments and situations the application deployment system may continue to use component EEE version 1.3 even after the upgrade if the use occurs outside the U.S., such as due to the lower cost, and to use component EEE version 1.4 after the upgrade within the U.S.

As previously noted, section 343 corresponds to pricing information for a usage model of component HHH, which is based on different use dimensions than is component EEE. The fee information in section 348 corresponds to charges for the use of various computing nodes to execute Application AAA, such as may be charged by the application deployment system and/or by a program execution service that provides some or all of the computing nodes that are used. In other embodiments, various other types of information about components, component usage and component pricing may be displayed in other manners in other embodiments.

Thus, when appropriate (e.g., once a month, for each component usage, after a predetermined amount of fees are owed, when canceling a subscription, etc.), fees to be charged to a user for the use of one or more software components via one or more applications are determined. The determination of such fees may include retrieving information about the configured usage model(s) specified for use of the components, and using tracked execution information to determine corresponding fees. Other fees (e.g., recurring application use fees, fees owed by the user to the application deployment system for execution that is not specific to software components, fees owed by the user to one or more program execution services for execution that is not specific to software components, fees owed by the user to the configurable component usage system, etc.) may also be determined and added to the fees owed by the user based on the component usage. Payment may be obtained by the application deployment system (or a separate payment system, not shown) using supplied payment information from the user. If obtaining payment is not successful, in some embodiments various remedial actions are taken, such as contacting the user to obtain alternative payment information and/or to prevent future access to the components and/or the application.

After receiving payment of fees from the user, the application deployment system may allocate at least some of the fees received to the providers of the components used by the application, and initiate payment of the allocated amounts to those parties. In at least some embodiments, the application deployment system may also allocate at least some of the fees to itself for the functionality that it provides, and if so the net proceeds received by the component providers may be reduced appropriately. In at least some embodiments, an application creator or provider user associated with an application may interact with the application deployment system to monitor (e.g., in substantially real-time) use of components via the application and/or to monitor fees to be paid to the component providers.

As will be appreciated, the example user interfaces and other example information displayed with respect to FIGS. 2A-3 are provided for example purposes, and the same or related functionality may be performed in other manners in other embodiments. For example, in other embodiments more or less information may be displayed to a user and/or obtained from a user. Additionally, some or all of the information may be provided to a user and/or obtained from a user in other manners, such as programmatically rather than via a graphical user interface, or via the use of a custom application rather than via a Web-based interface.

Figure 4:
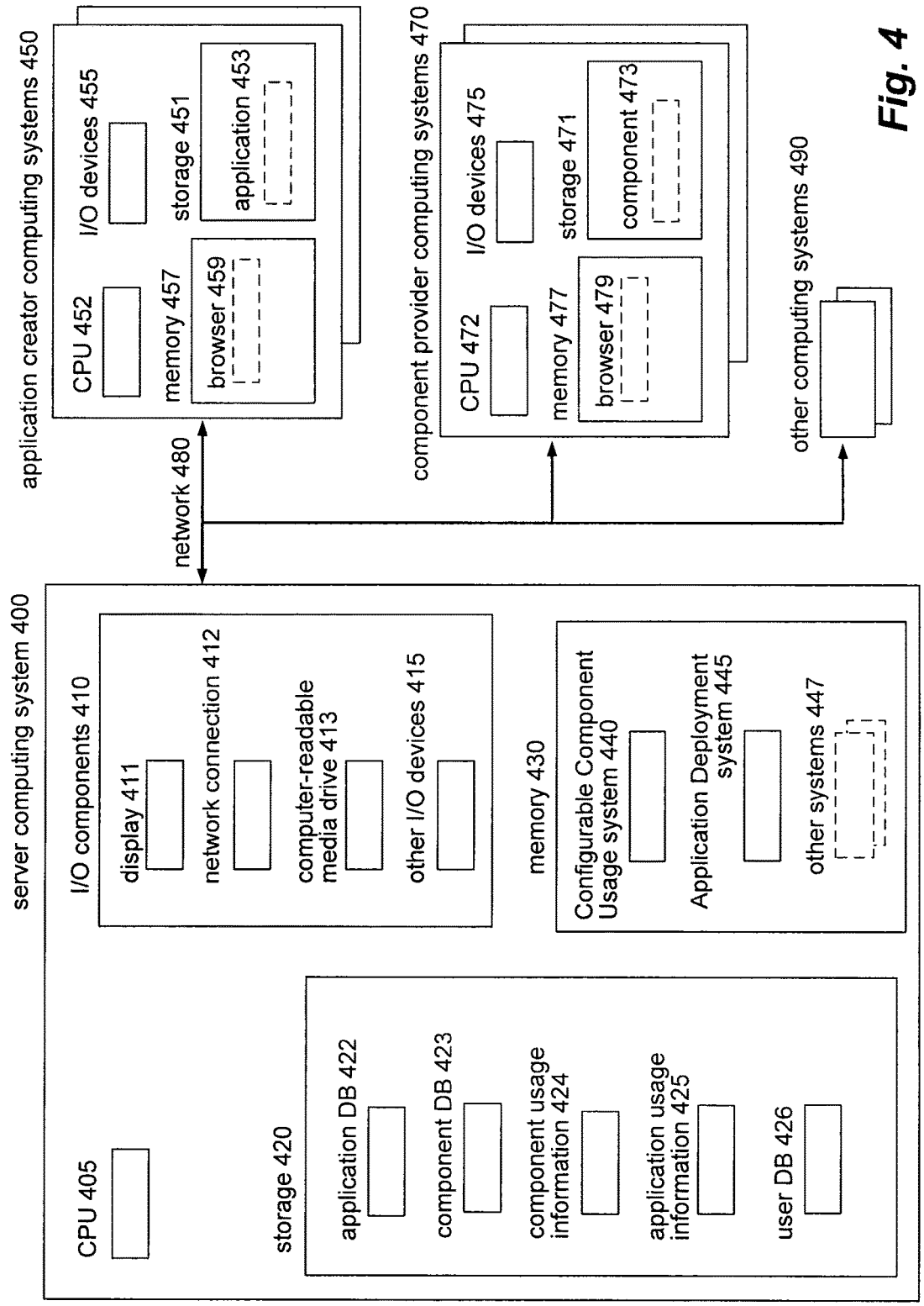
FIG. 4 is a block diagram illustrating a computing system suitable for managing execution of a software application that uses software components.

FIG. 4 illustrates a server computing system 400 suitable for executing an embodiment of the configurable component usage system and/or an embodiment of the application deployment system, as well as various other computing systems. In this example, the other computing systems include one or more application creator client computing systems 450, one or more component provider client computing systems 470, and one or more optional other computing systems 490. In the illustrated embodiment, the server computing system 400 includes one or more CPU processors 405, various I/O components 410, storage 420, and memory 430. The example I/O components include a display 411, a network connection 412, a computer-readable media drive 413, and other I/O devices 415 (e.g., a keyboard, a mouse, speakers, etc.).

An embodiment of the configurable component usage system 440 is executing in memory 430, and it interacts with the other computing systems over the network 480 (e.g., via the Internet and/or the World Wide Web, via a private cellular network, etc.). The other computing systems may similarly execute various software as part of the interactions. For example, a Web browser 479 executing in memory 477 of a component provider computing system allows a component provider user (not shown) to interact with the configurable component usage system 440 over the network 480 (e.g., to configure usage models for software components being registered for use by other software applications). After one or more such software components are registered, the system 440 stores information about the registered software components in a database data structure 423 on storage 420, and optionally provides information about the registered software components to the application deployment system 445 and/or to other systems (e.g., to optional other systems 447). In addition, the software code and any other data that is part of a registered software component may in some embodiments be stored in the database 423 on storage 420, or alternatively may be stored remotely (e.g., as a component 473 on storage 471 of the component provider user's computing system 470, on an optional other computing system 490, etc.) and retrieved by the systems 440 and/or 450 as desired.

In addition, an embodiment of the application deployment system 445 is also executing in memory 430, although in other embodiments the systems 440 and 445 may be provided on distinct server computing systems (e.g., optionally operated by distinct entities). In this example, the application deployment system 445 also interacts with other computing systems over the network 480. For example, a Web browser 459 executing in memory 457 of an application creator computing system allows an application creator user (not shown) to interact with the application deployment system 445 over the network 480 (e.g., to specify information for software applications to be executed, including to indicate registered software components that will be included in or otherwise used by such a software application). As part of enabling an application creator user to obtain information about registered software components, the application deployment system 445 may dynamically interact with the configurable component usage system 440 in order to obtain current information about registered software components, or may in some embodiments obtain such information in other manners (e.g., based on accessing the database 423 on storage, based on retrieving stored information that was previously pushed to the system 445 by the system 440, etc.). After one or more such software applications are specified, the system 445 stores information about the software applications in a database data structure 422 on storage 420, optionally after generating an executable copy of the software application to be stored. The system 445 may further optionally provide information about the software application to one or more other systems, such as an optional other program execution system (e.g., one of the optional other systems 447, a system on an optional other computing system 490, etc.) that provides a program execution service to be used by the application deployment system 445 for subsequent execution of the software application. Thus, the software code and any other data that is part of a software application may in some embodiments be stored in the database 422 on storage 420, or alternatively may be stored remotely (e.g., as a component 453 on storage 451 of the application creator user's computing system 450, on an optional other computing system 490, etc.) and retrieved by the system 450 as desired.

After information for a software application has been specified to the application deployment system by an application creator user, that application creator user or another end user may interact with the application deployment system 445 to initiate execution of the software application. In the illustrated embodiment, the application deployment system may use one or more of a plurality of available computing nodes (e.g., on one or more of the optional other computing systems 490) to execute the software application, although in other embodiments the software application execution may be performed in other manners (e.g., on the server computing system 400, on a computing system 450 or 490 of the user that initiates the execution, by using a distinct program execution service that provides the computing nodes for the execution, etc.). The application deployment system manages the execution of the software application throughout the execution lifecycle, and further tracks information about the execution of any included software components, as well as optionally about the execution of the software application independently of any such software components. In the illustrated embodiment, a variety of additional database data structures 424 and 425 are present on the storage 420 for use by the application deployment system, such as to store information about such tracked usage of applications and included software components, although in other embodiments some or all such databases may instead be located elsewhere and/or be organized in other manners. Furthermore, in other embodiments the stored information may be stored in other manners.

The application deployment system 445 further performs automated operations in some embodiments and situations to determine fees owed by the user for the execution of the software application, such as based at least in part on the tracked usage of the included software components and on pricing-based conditions in the configured usage models for those software components. The application deployment system 445 may further in some embodiments perform automated operations to obtain corresponding payment for the determined fees in at least some embodiments (e.g., based on dynamically obtained or previously obtained payment information for the user, such as part of user account information for the user that may be stored by the system 445 in a user database 426 of the storage 420), although in other embodiments the system 445 may instead provide information about the determined fees to one or more other systems to obtain payment. Such other systems may include, for example, an automated payment system that is one of the other systems 447.

It will be appreciated that the illustrated computing systems are merely illustrative and are not intended to limit the scope of the present invention. The computing systems 400, 450, 470 and/or 490 may instead each include multiple interacting computing systems or devices, and those computing systems may be connected to other devices that are not illustrated, including through one or more networks such as the Internet, via the Web, or via private networks (e.g., mobile communication networks, etc.). More generally, a server or client computing system or device may comprise any combination of hardware or software that can interact, including (without limitation) desktop or other computers, network devices, PDAs ("Personal Digital Assistants"), cell phones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated systems 440 and/or 445 may in some embodiments be distributed in various modules (not shown). In some embodiments, at least some of the described functionality of the configurable component usage system may instead not be provided as part of an embodiment of the configurable component usage system and/or other additional functionality may be available, and similarly at least some of the described functionality of the application deployment system may instead not be provided as part of an embodiment of the application deployment system and/or other additional functionality may be available.

It will also be appreciated that, while various items are discussed or illustrated as being stored in memory or on storage while being used, these items or portions of them may be transferred between memory and other storage devices for purposes of memory management and data integrity. Alternatively, in other embodiments some or all of the software systems may execute in memory on another device and communicate with the illustrated computing systems via inter-computer communication. Furthermore, in some embodiments, some or all of the systems and/or modules may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules and/or data structures may also be stored (e.g., as software instructions or structured data) on a computer-readable storage medium, such as a hard disk, memory, a network, or a portable media article (e.g., a DVD or a flash memory device) to be read by an appropriate drive or via an appropriate connection. The systems and data structures may also be transmitted via generated stored data signals (e.g., by being encoded in a carrier wave or otherwise included as part of an analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present techniques may be practiced with other computer system configurations.

Figure 5:
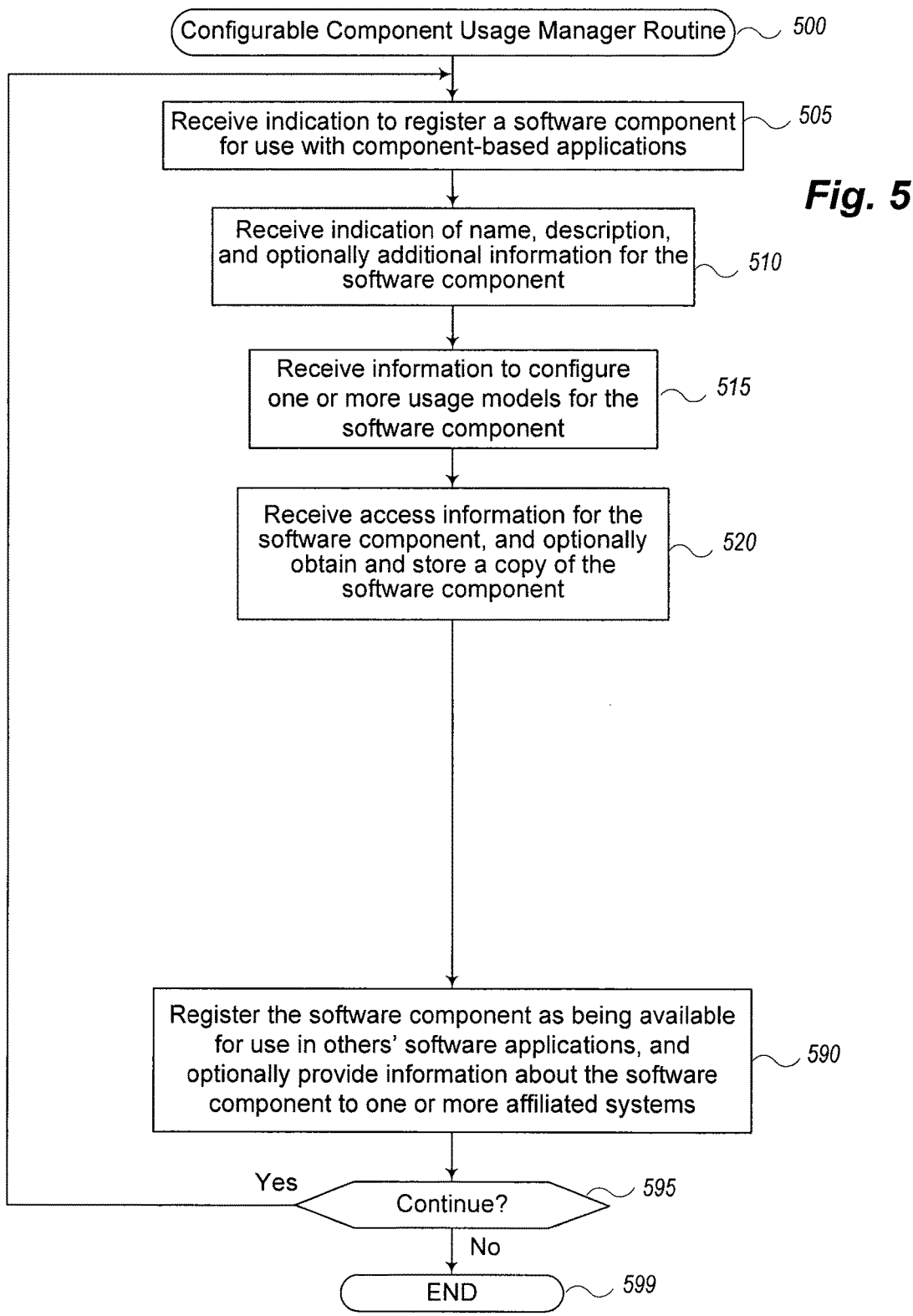
FIG. 5 is a flow diagram of an example embodiment of a Configurable Component Usage Manager routine.

FIG. 5 is a flow diagram of an example embodiment of a Configurable Component Usage Manager routine 500. The routine may, for example, be provided by execution of the configurable component usage system 125 of FIG. 1 (e.g., by the manager module 130) and/or of the configurable component usage system 440 of FIG. 4, such as to allow component provider users to register their software components and to configure usage models for use of those software components. In this illustrated example, the software component registration is performed in an interactive manner by the component provider, although in other embodiments it may be performed in other manners.

The illustrated embodiment of the routine begins at block 505, where the routine receives an indication from an application creator user to register a software component. In block 510, information is received from the application creator user that indicates a name, a description and optionally additional information for the software component. A variety of types of additional information may be specified, as discussed in greater detail elsewhere, and some types of additional information indicated may depend on the type of application. In block 515, the routine then receives information from the application creator user to configure one or more usage models for the software component. As discussed in greater detail elsewhere, each such configured usage model may optionally have one or more pricing conditions and may optionally have one or more non-pricing conditions. In block 520, the routine then receives access information from the application creator user for use in accessing the software component as needed, such as by receiving an uploaded copy of the software component or by receiving information to enable later retrieval of the software component (e.g., from an indicated network-accessible location).

After block 520, the routine continues to block 590 to complete the registration of the software component so that it is available for use by the third-party software applications, including to store the information received in blocks 510-520, and further optionally provides information about the registered software components to one or more affiliated systems. As described in greater detail elsewhere, such affiliated systems may include, for example, an embodiment of the application deployment system and an embodiment of a program execution system providing a program execution service.

After block 590, the routine continues to block 595 to determine whether to continue, such as until an explicit indication to terminate is received. If so, the routine returns to block 505, and if not continues to block 599 and ends.

Figure 6:
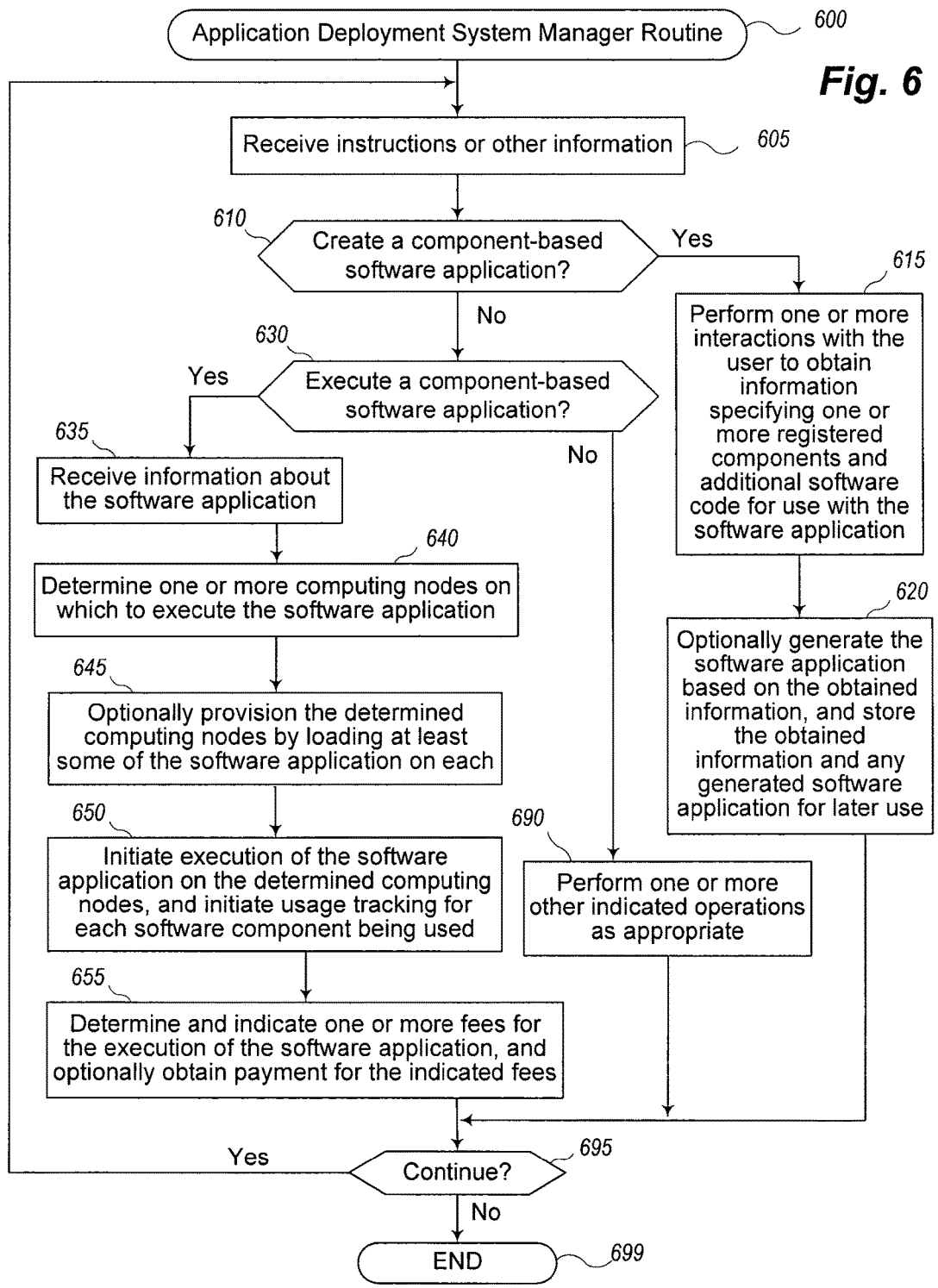
FIG. 6 is a flow diagram of an example embodiment of an Application Deployment System Manager routine.

FIG. 6 is a flow diagram of an example embodiment of an Application Deployment System Manager routine 600. The routine may, for example, be provided by execution of the application deployment system 105 of FIG. 1 (e.g., by the manager module 110) and/or of the application deployment system 445 of FIG. 4, such as to allow application creator users to create software applications that use third-party software components and/or manage execution of such software applications. In this illustrated example, the software application creation is performed in an interactive manner by the application creator, although in other embodiments it may be performed in other manners.

The illustrated embodiment of the routine begins at block 605, wherein instructions or other information is received. The routine continues to block 610 to determine whether instructions are received in block 605 to create a component-based software application. If so, the routine continues to block 615 to perform one or more interactions with the application creator user to obtain information specifying the software application, including to indicate one or more registered software components to be included in the software application, as well as to optionally indicate additional software code to be used as part of the software application. It will be appreciated that the interactions to specify a software application may be performed in a variety of manners in various embodiments. After block 615, the routine continues to block 620 to optionally generate an executable copy of the software application based on the obtained information, including by obtaining and using the indicated software components in at least some situations. The obtained information and any generated software application is then stored for later use, although in other embodiments the generated software application may instead be immediately executed or alternatively not generated until later execution.

If it is instead determined in block 620 that the received information in block 605 is not an instruction to create a component-based software application, the routine continues instead to block 630 to determine if the received information in block 605 is an instruction to execute a previously specified component-based software application. If so, the routine continues to block 635 to receive information about the software application, such as to retrieve information that was previously stored with respect to block 620. In block 640, the routine then determines one or more computing nodes on which to execute the software application, and in block 645 optionally provisions the determined computing nodes by loading at least some of the software application on each such computing node, if that software is not already present on those computing nodes. The determination of a quantity of computing nodes may be made in various manners (e.g., based at least in part on information specified by the application creator user when creating the software application and/or by a user when specifying the current instruction to execute the software application), and particular computing nodes may be selected in various manners (e.g., based at least in part on conditions specified in the configured usage models of one or more registered software components to be used during the execution of the software application).

Figure 7:
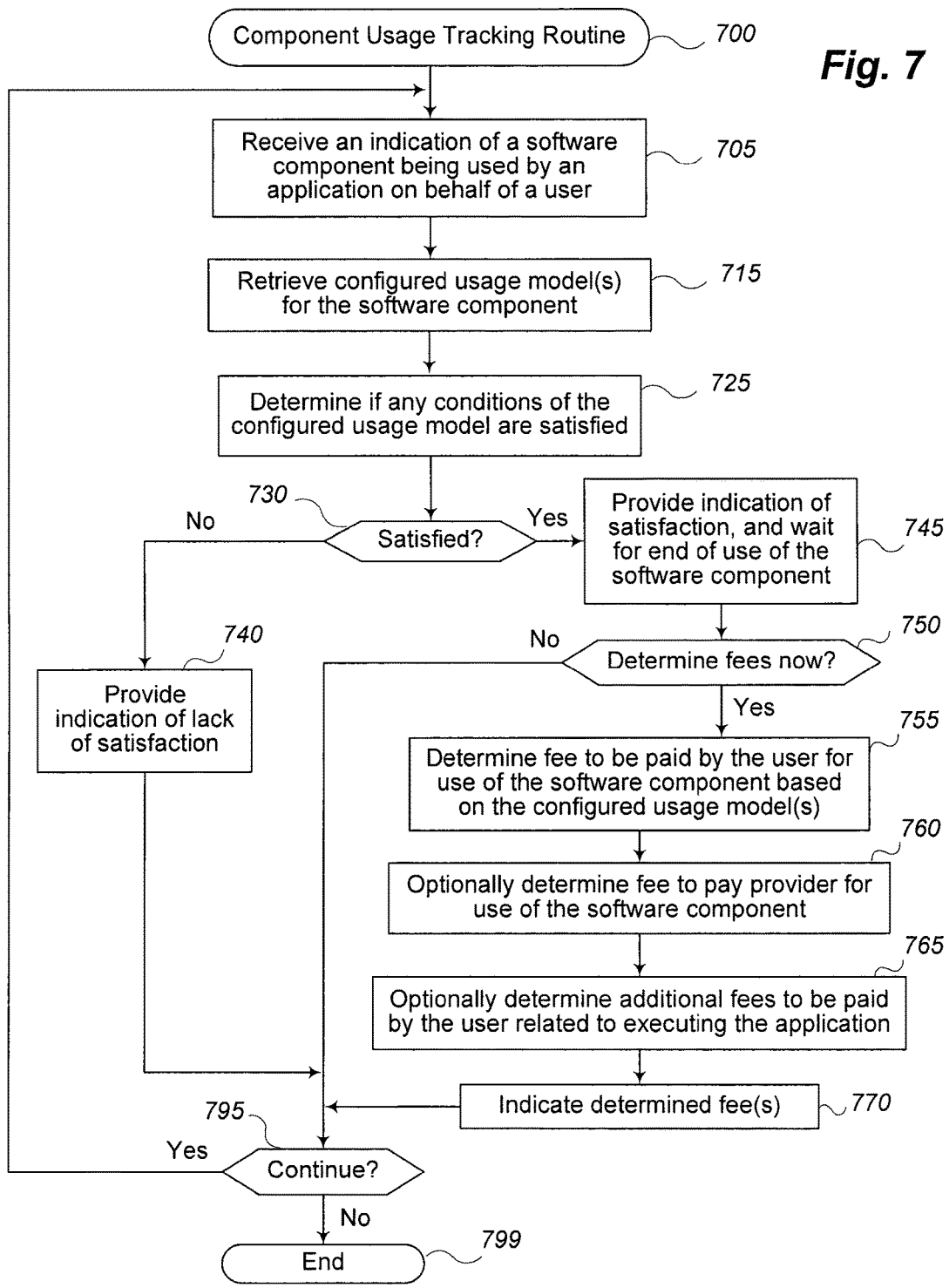
FIG. 7 is a flow diagram of an example embodiment of a Component Usage Tracking routine.

In block 650, execution of the software application is then initiated by initiating execution of the software loaded on each of the determined computing nodes, with the execution of the software application being managed in at least some embodiments so that the entire execution lifecycle from beginning of execution to completion of execution on each of the determined computing nodes is managed. Furthermore, in at least some embodiments, the managing of the execution of the software application includes tracking usage of at least the software components, with the routine of FIG. 7 illustrating one example of a routine for performing such tracking. In some embodiments, if one or more conditions of a configured usage model of a registered software component are determined to not be satisfied, whether pricing conditions and/or non-pricing conditions, the execution of the software application may not be initiated and/or may be halted if execution has already begun, while in other embodiments other types of actions may be taken. After block 650, the routine continues to block 655 to determine and indicate one or more fees to be charged for the execution of the software application, and to optionally obtain payment from the user for the fees—in some embodiments, the determination of fees may be based at least in part on information received from performance of the tracking of software component use, such as is discussed in greater detail with respect to FIG. 7. While the determination of the fees is performed after the execution of the software application is completed in the illustrated embodiment, in other embodiments the fee determination may be performed at other times (e.g., before execution, during execution, periodically, etc.). In addition, in some embodiments, some or all of the operations of blocks 640-655 may instead be performed by one or more program execution services with which the routine interacts.

If it is instead determined in block 630 that the received information in block 605 is not an instruction to execute a component-based software application, the routine continues instead to block 690 to perform one or more other indicated operations as appropriate. A non-exclusive list of such other indicated operations includes creating software applications for immediate or later use that do not include any third-party software applications, requesting information from an embodiment of the configurable component usage system about registered software components (e.g., periodically, as part of or before the interactions of block 615, etc.), receiving and storing information from an embodiment of the configurable component usage system about registered software components (e.g., as pushed from the configurable component usage system), etc.

After blocks 620, 655 or 690, the routine continues to block 695 to determine whether to continue, such as until an explicit indication to terminate is received. If it is determined to continue, the routine returns to block 605, and otherwise continues to block 699 and ends.

FIG. 7 is a flow diagram of an example embodiment of a Component Usage Tracking routine 700. The routine may, for example, be provided by execution of a component of the configurable component usage system 110 of FIG. 1 and/or of the configurable component usage system 440 of FIG. 4, or alternatively by a program execution service that is participating in the execution of a software application, such as to track usage of software components by applications on behalf of users in order to determine fees to be paid by the users, as well as to allocate received fees to component providers as appropriate. In some embodiments, the routine may execute continuously or periodically, or instead as initiated by another routine (e.g., in block 650 of FIG. 6).

The routine begins at block 705, where an indication is received of a software component to be used by a software application on behalf of a user. In the illustrated embodiment, the received indication may reflect an access request that is performed before the component use occurs, or may reflect an indication of actual component use that is made during or after the component use occurs. After receiving the indication, the routine continues to block 715 to retrieve information for use in determining corresponding fees for the component use and any restrictions on the component use, including any configured usage models for the software component that specify pricing conditions and/or non-pricing conditions.

In the illustrated embodiment, the routine next continues to block 725 to determine if the use of the software component is authorized based on any conditions from the retrieved configured usage models being satisfied. After block 725, the routine continues to block 730 to determine whether the component use is authorized, and if not continues to block 740 to provide an indication of a lack of authorization. If the component use is authorized, the routine continues instead to block 745 to provide an indication of authorization, and to wait until the use of the software component has ended. While the condition satisfaction is thus only verified once in the illustrated embodiment, in other embodiments the satisfaction of the conditions may continue to be tracked during some or all of the use of the software component.

After block 745, the routine continues to block 750 to determine whether fees should be determined now, such as if fees are determined for each component use indication, or if a specified amount of time or component use have occurred since a last time that fees were determined. If not, or after block 740, the routine continues to block 795. If fees are to be determined now, however, the routine continues instead to block 755 to determine one or more fees to be paid by the user. The fee(s) to be paid by the end user may be determined, for example, by retrieving the configured usage model for use of the software component, and applying the configured use price(s) to any currently received information regarding an amount of use of the indicated software component. If the fee determination is to be performed for more than just the current component usage, stored information about prior component use by one or more application copies of behalf of the user may be retrieved and similarly used to determine one or more corresponding fees. Once the fee(s) to be paid by the user are determined, the routine continues to block 760 to optionally determine one or more fees to be paid to the provider of the indicated software component, such as a percentage or other portion (or all) of the fees determined in block 755 based on use of the software component. The routine next continues to block 765 to optionally determine any additional fee(s) to be paid by the user for the execution of the software application that are not specific to the software component, such as based on use of particular computing nodes and/or other computing-related resources (e.g., storage, bandwidth, processor utilization, etc.), including fees (if any) charged by one or more program execution services used as part of the execution and/or by the application deployment system related to the execution. The routine then continues to block 770 to indicate the determined fees, such as in response to a request received in block 705 (e.g., as part of response information in block 650 of FIG. 6 if the routine 700 is invoked at that block).

After block 770, the routine continues to block 795 to determine whether to continue, such as until an explicit indication to terminate is received. If so, the routine returns to block 705, and if not continues to block 799 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable medium having instructions stored thereupon which, when executed by a processor, cause the processor to:
   receive, at a first computing system via one or more electronic communications sent over one or more computer networks from a second computing system, information about a software application to be executed, the received information identifying a software component to be used by the software application during execution, the indicated software component having an associated usage model that specifies one or more conditions for use of the indicated software component;
   manage, by the first computing system, the execution of the software application on computing nodes during a period of time, the managing of the execution including:
      for each of the computing nodes, determining at least a portion of the software application to be executed on the computing node;
      performing, via one or more additional electronic communications sent over the one or more computer networks between an application deployment system and a distinct program execution service that provides the computing nodes for use by customers, interactions with the program execution service to cause the program execution service to
         programmatically identify, from a plurality of computing nodes of the program execution service, available computing nodes that have resources for executing the software application;
         select the computing nodes on which to perform the execution of the software application from the available computing nodes,
         cause to be loaded, for each of the computing nodes, the determined at least portion of the software application on the computing node,
         initiate, for each of the computing nodes, executing of the determined at least portion of the software application on the computing node for at least some of the period of time, wherein the indicated software component executes on at least one of the one or more computing nodes as part of the at least portion of the software application for those at least one computing nodes;
         monitor, for each of the computing nodes, execution of the at least the portion of the software application on the computing node; and
         cause one or more of a release of one or more of the computing nodes or a pause of execution of the at least the portion of the software application on the computing node based, at least in part, on the monitoring;
   track, by the configured computing system, satisfaction during the execution of the software application of the indicated conditions for use of the indicated software component; and
   provide an indication of the tracked satisfaction of the indicated conditions for use of the indicated software component.

2. The non-transitory computer-readable medium of claim 1 wherein the computing nodes on which the execution of the software application occurs during the period of time includes multiple computing nodes, wherein the application deployment system controls the execution of the software application on the computing nodes provided by the program execution service, and wherein the managing of the execution of the software application comprises, for each of the multiple computing nodes, initiating loading of the at least portion of the software application on the computing node.

3. The non-transitory computer-readable medium of claim 2 wherein the executing of the indicated software component on the at least one computing node includes using an updated newer version of the indicated software component by replacing use of the indicated software component with use of the updated newer version during the execution of the software application.

4. The non-transitory computer-readable medium of claim 1 wherein the computing nodes on which the execution of the software application occurs during the period of time are a subset of a plurality of available computing nodes, wherein the one or more indicated conditions for use of the indicated software component include one or more restrictions that are not satisfied by all of the plurality of available computing nodes, and wherein the computing nodes on which the execution of the software application occurs during the period of time are selected from the plurality of available computing nodes based at least in part on satisfying the one or more restrictions.

5. The non-transitory computer-readable medium of claim 4 wherein the plurality of available computing nodes are located at multiple distinct geographical locations, and wherein the one or more restrictions relate to at least one of the multiple geographical locations.

6. The non-transitory computer-readable medium of claim 1 wherein the indicated software component is selected from a plurality of available software components, wherein the plurality of available software components includes multiple versions of a piece of software that have multiple different associated conditions for use, and wherein the indicated software component is of one of the multiple versions and is selected based at least in part on the indicated conditions for use of the indicated software component.

7. The non-transitory computer-readable medium of claim 1 wherein the indicated software component is selected from a plurality of available software components that each has an associated usage model specifying one or more conditions for use of that software component, wherein the conditions specified in the usage models associated with multiple of the plurality of available software components are restrictions that are not satisfied by the execution of the software application, and wherein the indicated software component is selected from the plurality of available software components based at least in part on the indicated conditions for use of the indicated software component being satisfiable by the execution of the software application.

8. The non-transitory computer-readable medium of claim 1 wherein, after the receiving of the information about the software application, the one or more conditions for use of the indicated software component are modified, and wherein the computer-readable medium has further instructions stored thereupon to take one or more actions for the software application to reflect the modified one or more conditions for use.

9. The non-transitory computer-readable medium of claim 1, wherein the tracking comprises determining an amount of one or more computing resources used by the indicated software component when executing, the one or more computing resources including at least one of an amount of storage used by the indicated software component or of an amount of data transferred in to the indicated software component.

10. A computer-implemented method, comprising:
receiving data at one or more computing devices describing a software application to be executed, the data identifying a software component to be used by the software application during execution, the software component having an associated usage model that specifies a condition for use of the software component;
at least one of the one or more computing devices identifying from a plurality of computing nodes provided by a program execution service, available computing nodes that have resources for executing the software application;
at least one of the one or more computing devices utilizing the data to select computing nodes, from the available computing nodes provided by the program execution service, upon which to execute the software application;
at least one of the one or more computing devices causing at least a portion of the software application including the software component to be loaded and executed on the selected computing nodes;
determining via at least one of the one or more computing devices, during execution of the software application, whether the condition for use of the software component has been satisfied; and
at least one of the one or more computing devices causing an action to be performed if the condition for use of the software component is not satisfied.

11. The computer-implemented method of claim 10, wherein a first portion of the computing nodes are located at a first geographical location, wherein a second portion of the computing nodes are located at a second geographical location, and wherein the condition for use of the software component comprises a geographical restriction on where the software component can be used.

12. The computer-implemented method of claim 10, wherein the condition for use of the software component relates to a type of use of the software component.

13. The computer-implemented method of claim 10, wherein determining whether the condition for use of the software component has been satisfied comprises tracking an amount of a computing resource used by the software component.

14. The computer-implemented method of claim 13, wherein the computing resource comprises an amount of storage used by the software component.

15. The computer-implemented method of claim 13, wherein the computing resource comprises an amount of data transferred by the software component.

16. A computing system, comprising:
a processor; and
a non-transitory computer-readable medium having instructions stored thereupon which, when executed by the processor, cause the processor to:
receive information describing a software application to be executed, the received information identifying a software component to be used by the software application during execution, the software component having an associated usage model that specifies a condition for use of the software component;
identify available resources of a plurality of computing nodes provided by the program execution service;
select from the plurality of the computing nodes, computing nodes that have resources for executing the software application based at least in part on the available resources;
cause at least a portion of the software application including the software component to be loaded on and executed on the computing nodes provided by the program execution service;
monitor execution of the software application on the computing nodes;
determine, during execution of the software application, whether the condition for use of the software component has been satisfied based at least in part on the monitoring; and
cause an action to be performed if the condition for use of the software component is not satisfied.

17. The computing system of claim 16, wherein the condition for use of the software component comprises a geographical restriction.

18. The computing system of claim 16, wherein determine whether the condition for use of the software component has been satisfied comprises tracking an amount of a computing resource used by the software component.

19. The computing system of claim 18, wherein the computing resource comprises an amount of storage used by the software component.

20. The computing system of claim 18, wherein the computing resource comprises an amount of data transferred by the software component.

\* \* \* \* \*